Patented Oct. 11, 1949

2,484,503

UNITED STATES PATENT OFFICE 2,484,503

POLYMETHIN DYES AND INTERMEDIATES

Frances M. Hamer, Russell J. Rathbone, and Barbara Seaton Winton, Harrow, Wealdstone, England, assignors to Eastman Kodak Company, Rochester, N. Y., a corporation of New Jersey No Drawing. Application February 1, 1947, Serial No. 725,960. In Great Britain February 22, 1946

12 Claims. (Cl. 260—240)

This invention relates to polymethin dyes and intermediates, and to a process for preparing the same.

In a copending application of Edward B. Knott, Serial No. 604,521, filed July 11, 1945, it is shown that cyclammonium quaternary salts containing a β-anilinovinyl group in the α- or γ-position can be prepared by condensing a cyclammonium quaternary salt containing a reactive methyl group in the α- or γ-position, with a compound selected from those represented by the following general formula:

$$Ar_1N=CH—OR_1$$

wherein $Ar_1$ represents an aryl group of the benzene series, e. g. phenyl or substituted phenyl and $R_1$ represents an aliphatic group, e. g. alkyl, substituted alkyl or an unsaturated aliphatic group. Typical compounds represented by the above general formula are the alkylisoformanilides, e. g. methylisoformanilide, ethylisoformanilide, n - propylisoformanilide, n - butylisoformanilide, isobutylisoformanilide, etc.

We have now found that a compound of the above general formula will condense with a heterocyclic nitrogen base having a methylene group attached to the carbon atom in the α- or γ-position to the ternary nitrogen atom to give a heterocyclic nitrogen base having a dianiloisopropylidene group in the α- or γ-position to the ternary nitrogen atom. From these new dianiloisopropylidene intermediates polymethin dyes can be formed.

It is, accordingly, an object of our invention to provide new dye intermediates. A further object is to provide a process for preparing such intermediates. A still further object is to provide a process for preparing dyes from such intermediates. Other objects will become apparent hereinafter.

The reaction by which our new dianiloisopropylidene intermediates are formed can be represented as follows:

I.

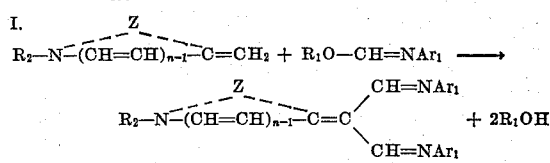

wherein $R_1$ and $Ar_1$ have the values given above, $R_2$ represents a member selected from the group consisting of an alkyl group, an aralkyl group and an aryl group, e. g. methyl, ethyl, n-propyl, n-butyl, isobutyl, benzyl, phenyl, etc., $n$ represents a positive integer of from 1 to 2, and Z represents the non-metallic atoms necessary to complete a heterocyclic nucleus containing from 5 to 6 atoms in the heterocyclic ring, e. g. a dihydropyridine, a dihydroquinoline, a thiazoline, a thiazolidine, a benzthiazoline, a naphthiazoline, a selenazoline, a benzselenazoline, an indoline nucleus, etc.

Typical heterocyclic nitrogen bases having a methylene group attached to the carbon atom in the α- or γ-position are: the 3-alkyl-2-methylene-Δ⁴-thiazolines (e. g. 3,4-dimethyl-2-methylene - Δ⁴ - thiazoline, 3 - methyl - 2 - methylene-4-phenyl-Δ⁴-thiazoline, etc.), the 3 - alkyl-2-methylenebenzthiazolines (e. g. 3-methyl-2-methylenebenzthiazoline, 4-chloro-3-ethyl-2-methylenebenzthiazoline, 3-n-butyl-2-methylenebenzthiazoline, 5-chloro-3-ethyl-2 - methylenebenzthiazoline, 3 - ethyl-5-methoxy-2-methylenebenzthiazoline, etc.), the 2-aryl - 2 - methylenebenzthiazolines (e. g. 2 - methylene-3-phenylbenzthiazoline, etc.), the 3-alkyl-2-methylene-6:7-benzbenzthiazolines (e. g. 3-methyl - 2 - methylene-6:7 - benzbenzthiazoline, etc.), the 1 - alkyl-2-methylene-4:5-benzbenzthiazolines (e. g. 1-methyl-2-methylene-4:5-benzbenzthiazoline, 1-ethyl-2-methylene-4:5-benzbenzthiazoline, etc.), the 3-alkyl-2-methylene-Δ⁴-selenazolines (e. g. 3,4-dimethyl-2-methylene - Δ⁴ - selenazoline, 3-methyl-2-methylene-4-phenyl-Δ⁴-selenazoline, etc.), the 3 - alkyl-2-methylenebenzselenazolines (e. g. 3-ethyl-2-methylenebenzselenazoline, 3 - methyl-2-methylenebenzselenazoline, etc.), the 1-alkyl-2-methylenequinolines (e. g. 1-methyl-2-methylene-1,2-dihydroquinoline, 1 - ethyl-2-methylene-1,2-dihydroquinoline, etc.), the 1-alkyl-4-methylene - 1,4 - dihydroquinolines (e. g. 1-methyl-4-methylene-1,4-dihydroquinoline, 1-ethyl-4-methylene-1,4-dihydroquinoline, etc.), the 1,3,3-trialkyl-2-methyleneindolines (e. g. 1,3,3-trimethyl-2-methyleneindoline, 1 - ethyl - 3,3 - dimethyl-2-methyleneindoline, etc.), etc.

We have further found that a compound of the above general formula $Ar_1N=CH—OR_1$ will also condense with a heterocyclic nitrogen base having an aniloethylidene group in the α- or γ-position to the ternary nitrogen atom to give a heterocyclic nitrogen base having a daniloisopropylidene group in the α- or γ-position to the ternary nitrogen atom. The heterocyclic nitrogen bases having an aniloethylidene group in the α- or γ-position can be prepared from the corresponding quaternary salt as described in United States Patent 2,298,372, dated October 13, 1942. This reaction involving the condensation of the aniloethylidene compound with the heterocyclic nitrogen bases containing the methylene group can be represented as follows:

Ia

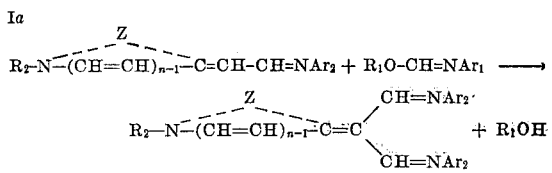

wherein $R_1$, $Ar_1$, $R_2$, $n$ and $Z$ have the values given above and $Ar_2$ represents an aryl group of the benzene series, e. g. phenyl, p-methoxyphenyl, p-ethoxyphenyl, p-tolyl, p-chlorophenyl, etc.

Typical heterocyclic nitrogen bases having an aniloethylidene group in the α- or γ-position are: the 3-alkyl-2-aniloethylidene-$\Delta^4$-thiazolines (e. g. 3,4-dimethyl-2-aniloethylidene-$\Delta^4$-thiazoline, 3-ethyl-4-phenyl-2-aniloethylidene-$\Delta^4$-thiazoline, etc.), the 3-alkyl-2-aniloethylidenebenzthiazolines (e. g. 3-methyl-2-aniloethylidenebenzthiazoline, 3-ethyl-2-aniloethylidenebenzthiazoline, etc.), the 3-alkyl-2-aniloethylidene-6:7-benzbenzthiazolines (e. g. 3-methyl-2-aniloethylidene-6:7-benzbenzthiazoline, 1-ethyl-2-aniloethylidene-6:7-benzbenzthiazoline, etc.), the 1-alkyl-2-aniloethylidene-4:5-benzbenzthiazolines (e. g. 1-methyl-2-aniloethylidene-4:5-benzbenzthiazoline, 1-ethyl-2-aniloethylidene-4:5-benzbenzthiazoline, etc.), the 3-alkyl-2-aniloethylidene-$\Delta^4$-selenazolines (e. g. 3,4-dimethyl-2-aniloethylidene-$\Delta^4$-selenazoline, 3-methyl-4-phenyl-2-aniloethylidene-$\Delta^4$-selenazoline, etc.), the 3-alkyl-2-aniloethylidenethiazolidines (e. g. 3-methyl-2-aniloethylidenethiazolidine, 3-ethyl-2-aniloethylidenethiazolidine, etc.), the 3-alkyl-2-aniloethylidenebenzselenazolines (e. g. 3-methyl-2-aniloethylidenebenzselenazoline, 3-ethyl-2-p-chloroaniloethylidenebenzselenazoline, etc.), the 1-alkyl-2-aniloethylidene-1,2-dihydroquinolines (e. g. 1-methyl-2-aniloethylidene-1,2-dihydroquinoline, 1-ethyl-2-aniloethylidene-1,2-dihydroquinoline, etc.), the 1-alkyl-4-aniloethylidene-1,4-dihydroquinolines (e. g. 1-methyl-4-aniloethylidene-1,4-dihydroquinoline, 1-n-butyl-4-aniloethylidene-1,4-dihydroquinoline, etc.), the 3-alkyl-2-aniloethylidenebenzoxazoline (e. g. 3-methyl-2-aniloethylidenebenzoxazole, 3-ethyl-2-aniloethylidenebenzoxazolines, etc.), etc.

Either of the above condensations is advantageously carried out by heating, employing a water-binding agent, such as zinc chloride as a condensing agent. The daniloisopropylidene compound is then obtained as a zinc chloride complex from which the daniloisopropylidene compound can be isolated by treatment with an alkali, e. g. an alkali metal hydroxide (for instance sodium hydroxide, potassium hydroxide) or an alkali metal alcoholate, e. g. sodium ethylate.

We have found that the daniloisopropylidene intermediate can be condensed with a cyclammonium quaternary salt (quarternary salt of a heterocyclic nitrogen base) having a methyl group in the α- or γ-position to the quaternary nitrogen atom to give polymethine dyes. In this condensation one molecular proportion of the daniloisopropylidene compound reacts with two molecular proportions of the quaternary salt to give polymethine dyes which can be represented by the following general formula:

II

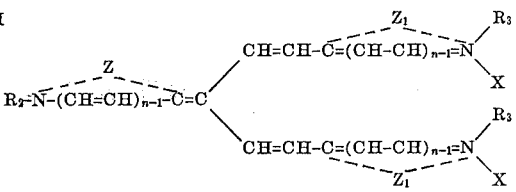

wherein $R_2$, $n$ and $Z$ have the values given above, $R_3$ represents an alkyl, aralkyl or aryl group, e. g. those set forth under $R_2$ above, X represents an anion, e. g. chloride, bromide, iodide, benzenesulfonate, p-toluenesulfonate, perchlorate, methylsulfate, ethylsulfate, acetate, thiocyanate, etc., $Z_1$ represents the non-metallic atoms necessary to complete a heterocyclic nucleus selected from heterocyclic nuclei containing from 5 to 6 atoms in the heterocyclic ring, e. g. the heterocyclic nuclei set forth under Z above.

Typical cyclammonium quaternary salts having a reactive methyl group in the α- or γ-position are: the 2-methylthiazole alkyl quaternary salts (e. g. 2-methylthiazole ethiodide, 2-methyl-4-phenylthiazole metho-p-toluenesulfonate, 2,4-dimethylthiazole ethiodide, etc.), the 2-methylbenzthiazole alkyl quaternary salts (e. g. 2-methylbenzthiazole ethiodide, 4-chloro-2-methylbenzthiazole n-propobromide, 5-chloro-2-methylbenzthiazole etho-p-toluenesulfonate, 2-methyl-4-phenylbenzthiazole ethiodide, 2-methyl-5-phenylbenzthiazole ethiodide, 2-methylbenzthiazole β-carboxyethobromide, etc.), the 2-methyl-6:7-benzbenzthiazole alkyl quaternary salts (e. g. 2-methyl-6:7-benzbenzthiazole etho-p-toluenesulfonate, 2-methyl-6:7-benzbenzthiazole ethiodide, etc.), the 2-methyl-4:5-benzbenzthiazole alkyl quaternary salts (e. g. 2-methyl-4:5-benzbenzthiazole ethiodide, 2-methyl-4:5-benzbenzthiazole etho-p-toluenesulfonate, etc.), the 2-methyloxazole alkyl quaternary salts (e. g. 2,4-dimethyloxazole ethiodide, 2-methyl-4-phenyloxazole ethiodide, etc.), the 2-alkylbenzoxazole alkyl quaternary salts (e. g. 2-methylbenzoxazole ethiodide, 2-methyl-5-phenylbenzoxazole n-butobromide, 5-chloro-2-methylbenzoxazole ethiodide, etc.), the 2-methyl-6:7-benzbenzoxazole alkyl quaternary salts (e. g. 2-methyl-6:7-benzbenzoxazole methiodide, 2-methyl-6:7-benzbenzoxazole ethiodide, etc.), the 2-methyl-4:5-benzbenzoxazole alkyl quaternary salts (e. g. 2-methyl-4:5-benzbenzoxazole ethiodide, 2-methyl-4:5-benzbenzoxazole n-propiodide, etc.), the 2-methylselenazole alkyl quaternary salts (e. g. 2,4-dimethylselenazole ethiodide, 2-methyl-4-phenylselenazole ethiodide, etc.), the 2-methylbenzselenazole alkyl quaternary salts (e. g. 2-methylbenzselenazole ethiodide, 2-methylbenzselenazole etho-ethylsulfate, 5-chloro-2-methylbenzselenazole metho-p-toluenesulfonate, etc.), the 2-methylthiazoline alkyl quaternary salts (e. g. 2-methylthiazoline methiodide, 2-methylthiazoline ethiodide, etc.), the quinaldine alkyl quaternary salts (e. g. quinaldine ethiodide, quinaldine carboxymethobromide, quinaldine β-hydroxyethiodide, quinaldine β-ethoxyethiodide, etc.), the lepidine alkyl quaternary salts (e. g. lepidine n-butiodide, lepidine ethiodide, lepidine carboxymethiodide, etc.), the 1,3,3-trimethylindolenine alkyl quaternary salts (e. g. 1,3,3-trimethylindolenine alkyl quaternary salts (e. g. 1,3,3-trimethylindolenine methiodide, 1,3,3-trimethylindolenine ethiodide, etc.), the 2-methylbenzimidazole alkyl quaternary salts (e. g. 1,2-dimethyl-3,4-trimethylenebenzimidazole methylsulfate, 1,2-dimethylbenzimidazole metho-methylsulfate, etc.), etc.

The above dyes of formula II can exist in more than one resonance configuration and either one of the anions (X) may be shown associated with the nitrogen atom carrying the $R_2$ group.

Certain of the dyes of the above general formula I wherein Z and $Z_1$ all represent the same heterocyclic nucleus have been prepared before, viz.

1. Those in which all three nuclei are 4-quinoline nuclei by Clarke in United States Patent 1,804,674, dated May 12, 1931, and by Hamer, J. Chem. Soc. 1927, 2796 and 1928, 1472.

2. Those in which all three nuclei are thiazole nuclei by Brooker in United States Patent 1,994,562, dated March 19, 1935.

3. Those in which all three nuclei are benzthiazole, α-quinoline, α-pyridine or benzimidazole nuclei by Ogata, Bull. Inst. Phys. Chem. Res. Tokyo 13, 491 to 500 (1934).

Although the structure of the dyes given by Brooker in United States Patent 1,994,562 differs from that given herein, the synthetic method of the present invention, wherein a $\Delta^4$-thiazoline having a methylene group or an aniloethylidene group in the 2-position is condensed with a thiazole quaternary salt having a methyl group in the 2-position, gives a neothiazolocarbocyanine dye having the same properties as the one obtained by Brooker from the same 2-methylthiazole quaternary salt. The method of the present invention, therefore, establishes the chemical structure of neothiazolocarbocyanines as that put forward by Konig, without published supporting evidence in Z. Wiss. Phot. 39, 15 (1935).

The method described by Ogata is related in some respects to that already used by Hamer, supra, and by Brooker. We have not been able to isolate the α-quinoline or α-pyridine dyes by Ogata's method, but the dye which we have prepared by his method from 2-methylbenzthiazole ethiodide has been proved to be identical with the dye prepared by the present invention from 3 - ethyl - 2 - daniloisopropylidenebenzthiazoline and 2-methylbenzthiazole ethiodide.

The present invention, however, enables us to obtain dyes not hitherto known, in which the three nuclei are the same but do not consist of thiazole, benzthiazole, α-quinoline, γ-quinoline or benzimidazole nuclei. The invention, therefore, includes such new dyes as are depicted by formula II above wherein Z and $Z_1$ represent nuclei selected from the group consisting of pyridine, naphthoquinoline, benzbenzthiazoles, selenazole, benzselenazole, benzoxazole and indolenine nuclei.

The condensations to form the dyes of formula I are advantageously carried out in the presence of a basic condensing agent, for instance a tertiary amine (pyridine, triethylamine, tri-n-propylamine, tri-n-butylamine, N-methylpiperidine, N-ethylpiperidine, dimethylaniline, diethylaniline, etc.) or an alkali metal carboxylate (sodium acetate, potassium acetate, etc.) in the presence of a carboxylic anhydride (acetic anhydride, propionic anhydride, etc.). Heat accelerates the condensations.

The present invention also enables us to obtain dyes not hitherto known in which the three nuclei are not the same, i. e. those represented by formula II wherein Z and $Z_1$ each represents the non-metallic atoms necessary to complete a different heterocyclic nucleus, the difference being in the nuclear atoms themselves or in nuclear substituent groups or in both, or in the position of linking which may be alpha or gamma. In these new dyes two of the nuclei ($Z_1$) are alike but differ from the other (Z).

We have further found that one molecular proportion of a heterocyclic ternary nitrogen base having a dianiloisopropylidene group in the α- or γ-position to the ternary nitrogen atom (formula I) can be condensed with substantially one molecular proportion of a cyclammonium quaternary salt (quaternary salt of a heterocyclic nitrogen base) having a methyl group in the α- or γ-position to the quaternary nitrogen atom to give a polymethine dye which can be represented by the following general formula:

III

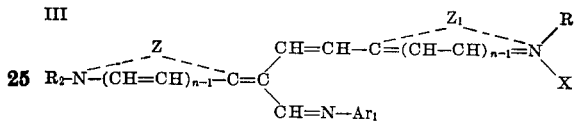

wherein $R_2$, $n$, Z, $Ar_1$, $Z_1$, $R_3$ and X have the values given above.

The condensations to form the dyes of formula III above are advantageously carried out in the presence of a basic condensing agent, e. g. the basic condensing agents recited above. Heat accelerates the condensations.

Although the condensations (formula III) just described above take place between one molecular proportion of the dianiloisopropylidene compound and one molecular proportion of the cyclammonium quaternary salt containing the reactive methyl group, it is not essential to employ those molecular ratios during the condensation. It is, however, generally necessary to conduct the condensation at a lower temperature or heat for a shorter time than when preparing the dyes of formula II.

We have found that the dyes of formula III above can be condensed with cyclammonium quaternary salts having a methyl group in the α- or γ-position to the quaternary nitrogen atom (e. g. the cyclammonium quaternary salts set forth above) to give polymethine dyes which can be represented by the following general formula:

IV

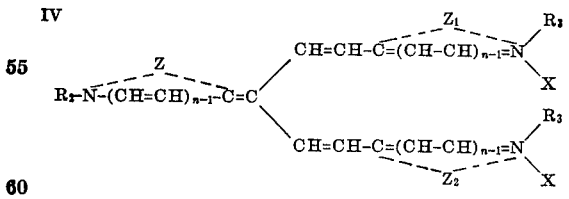

wherein $R_2$, $n$, Z, $R_3$, X and $Z_1$ have the values given above, and $Z_2$ represents the non-metallic atoms necessary to complete a heterocyclic nucleus containing from 5 to 6 atoms in the heterocyclic ring, e. g. the heterocyclic nuclei set forth under Z above. If Z, $Z_1$ and $Z_2$ each represents the non-metallic atoms necessary to complete the same heterocyclic nucleus or if $Z_1$ and $Z_2$ each represents the non-metallic atoms necessary to complete the same heterocyclic nucleus which is different from the heterocyclic nucleus of which Z represents the non-metallic atom necessary to complete, the dyes obtained by this condensation can also be obtained by the condensation described under formula II above.

Where $Z$, $Z_1$ and $Z_2$ each represents the non-metallic atoms necessary to complete a different heterocyclic nucleus, the dyes are not obtainable by any other known process.

These condensations of the dyes of formula III with a cyclammonium quaternary salt are advantageously effected in the presence of a basic condensing agent, e. g. the basic condensing agents set forth above.

We have further found that one molecular proportion of a heterocyclic nitrogen base having a dianiloisopropylidene group in the $\alpha$- or $\gamma$-position to the ternary nitrogen atom (formula I) can be condensed with substantially two molecular proportions of a compound having a reactive methylene group adjacent to an electro-negative group, such as a carbonyl or thiocarbonyl group, to give a novel kind of polymethine dye of the following general formula:

V

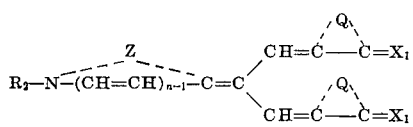

wherein $R_2$, $n$ and $Z$ have the values given above, $X_1$ represents a member selected from the group consisting of an oxygen and a sulfur atom, and Q represents the non-metallic atoms necessary to complete a cyclic nucleus containing from 5 to 6 atoms in the ring, especially a cyclic nucleus wherein the atom attached to the carbon atom of the

group is an atom selected from the group consisting of an oxygen atom, a sulfur atom and a nitrogen atom. Typical examples of cyclic nuclei containing from 5 to 6 atoms in the ring are: cyclic nuclei of the hydantoin series, of the 2-thiohydantoin series, of the oxydihydroquinoxaline series, of the 2-thio-2,4(3,5)-oxazoledione series, of the 5-oxazolone series, of the benzo-$\beta$-morpholone series, of the indoxyl series, of the rhodanine (2-thio-2,4(3,5)-thiazoledione) series, of the 4-thiazolidone series, of the pseudothiohydantoin series, of the 2,4(3,5)-thiazoledione (2,4-dihydroxythiazole) series, of the ketodihydrobenzparathiazine series, of the 2-amino-4(5)-thiazolone series, of the 2-mercapto-4(5)-thiazolone series, of the barbituric acid series, of the 2-thiobarbituric acid series, of the 1,3-diketo-hydrindene (indandione) series, of the 5-pyrazolone series, of the 5-thiopyrazolone series, of the isothiohydantoin series, of the 2,4 diketo-1,2,3,4-tetrahydroquinoline (2,4-dihydroxyquinoline) series, tetronic acid, of the coumaranone series, of the oxindole series, of the dihydrocarbostyril series, homophthalimide succimide, etc.

The cyclic compounds containing a reactive methylene group adjacent to a carbonyl or a thiocarbonyl group can be represented by the following general formula:

VI

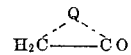

wherein Q has the value given above. An especially useful group of such cyclic compounds can be represented by the following general formula:

VII

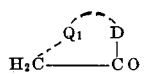

wherein D represents a member selected from the group consisting of an oxygen atom, a sulfur atom and a

group wherein $R_4$ represents a member selected from the group consisting of alkyl (including aralkyl and other substituted alkyl) and aryl groups, and $Q_1$ represents the non-metallic atoms necessary to complete a cyclic nucleus containing from 5 to 6 atoms in the ring. Typical examples of the compounds represented by general formula VII are: 3-alkyl-2-thio-2,4(3,5)-oxazolediones (e. g. 3-methyl-, 3-ethyl-, 3-n-propyl-, 3-n-butyl-, 3-lauryl, etc.) 3-sulfoalkyl-2-thio-2,4(3,5)-oxazolediones (e. g. 3-sulfomethyl-, etc.), 3-carboxyalkyl-2-thio-2,4(3,5)-oxazolediones (e. g. 3-carboxymethyl-), 3-alkyl-rhodanines (e. g. 3-methyl-, 3-ethyl-, 3-n-propyl-, 3-n-butyl-, 3-lauryl, etc.), 3-arylrhodanines (e. g. 3-phenyl-, 3-$\beta$-naphthyl-, 3-p-dimethylaminophenyl-, etc.), 3-carboxyalkylrhodanines (e. g. 3-carboxymethyl-, 3-$\alpha$-carboxyethyl-, 3-$\beta$-carboxyethyl-, 3-(1,3-dicarboxy-n-propyl)-, etc.), 3-sulfoalkylrhodanines (e. g. 3-sulfomethyl-, 3-$\beta$-sulfoethyl-, etc.), 3-carboxyarylrhodanines (e. g. 3-p-carboxyphenyl-, 3-(3-carboxy-4-hydroxy)phenyl-, etc.), 3-sulfophenylrhodanines (e. g. 3-p-sulfophenyl-, 3-(2,5-disulfophenyl)-, etc.), 4-thiazolidone, 2-amino-4(5)-thiazolones (e. g. 2-methylphenylamino-, 2-ethylphenylamino-, 2-diphenylamino-, etc.), thioxindoxyl, ketodihydrobenzparathiazine, 2-thiohydantoin, 1-alkyl-3-aryl-2-thiohydantoins (e. g. 1-methyl-3-phenyl-, 1-ethyl-3-phenyl-, etc.), 1,3-diaryl-2-thiohydantoins (e. g. 1,3-diphenyl-, etc.), etc.

The condensations to give the dyes of formula V are advantageously effected by heating in the presence of a basic condensing agent, e. g. a tertiary amine (for instance pyridine, triethylamine, tri-n-propylamine, tri-n-butylamine, triisoamylamine, N-methylpiperidine, N-ethylpiperidine, etc.). An alkali metal carboxylate, e. g. sodium or potassium acetate, in the presence of acetic anhydride, can also be used as basic condensing agent.

We have also found that one molecular proportion of a heterocyclic ternary nitrogen base having a dianiloisopropylidene group in the $\alpha$- or $\gamma$-position to the ternary nitrogen atom (formula I) can be condensed with substantially one molecular proportion of a compound having a reactive methylene group adjacent to an electro-negative group, such as a carbonyl or thiocarbonyl group, to give a novel kind of polymethine dye which can be represented by the following general formula:

VIII

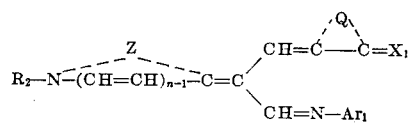

wherein $R_2$, $n$, $Z$, $Ar_1$, Q and $X_1$ have the values given above.

The condensations to form the dyes of formula VIII above are advantageously carried out in the presence of a basic condensing agent, e. g. the basic condensing agents set forth above. Heat accelerates the condensations.

Although the condensations (formula VIII) just described above take place between one molecular proportion of the dianiloisopropylidene compound and one molecular proportion of the compound having the carbonyl or thiocarbonyl group, it is not essential to employ these molecular ratios during the condensation. It is, however, generally necessary to conduct the condensations at lower temperatures or heat for a shorter period of time than when preparing the dyes of formula V.

We have found that the dyes of formula VIII above can be condensed with compounds containing an electronegative group (e. g. the compounds set forth by formulas VI and VII) to give polymethine dyes which can be represented by the following general formula:

IX

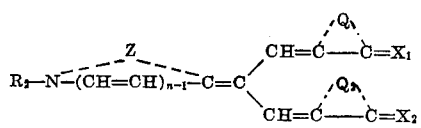

wherein $R_2$, $n$, Z, Q and $X_1$ have the values set forth above, and $Q_2$ represents the non-metallic atoms necessary to complete a cyclic nucleus containing from 5 to 6 atoms in the ring (e. g. those set forth under formula V) and $X_2$ represents a member selected from the group consisting of an oxygen and a sulfur atom. If $Q_1$ and $Q_2$ and $X_1$ and $X_2$ represent the same species, the dyes obtained by this condensation can also be obtained by the condensation described under formula V above. If $Q_1$ and $Q_2$ represent different species or if $X_1$ and $X_2$ represent different species, the dyes are not obtainable by any other known process.

These condensations of the dyes of formula VIII with a compound containing a carbonyl or thiocarbonyl group are advantageously effected in the presence of a basic condensing agent, e. g. the basic condensing agents set forth above.

We have also found that the dyes of formula VIII can be condensed with cyclammonium quaternary salts having a methyl group in the $\alpha$- or $\gamma$-position to the quaternary nitrogen atom (e. g. the cyclammonium quaternary salts set forth above) to give novel polymethine dyes which can be represented by the following general formula:

X

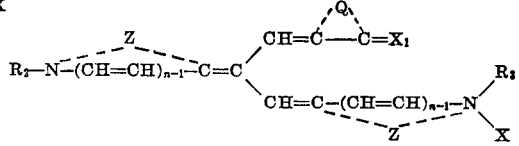

wherein $R_2$, $n$, Z, Q, $X_1$, $Z_1$, $R_3$ and X have the values given above. The same dyes can be prepared, we have found, by condensing the dyes of formula III with a compound containing a carbonyl or thiocarbonyl group (e. g. those described under formulas VI and VII.) Either of these condensations just described are advantageously carried out in the presence of a basic condensing agent, e. g. those described above.

The following examples will serve to illustrate further the manner of practicing our invention.

*Example 1.—3-ethyl-2-dianiloisopropylidene-benzothiazoline*

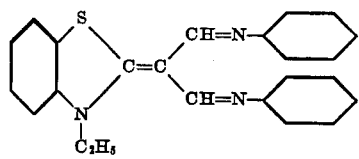

3-ethyl-2-methylenebenzothiazole (3 g.; 1 mol.), ethylisoformanilide (25 cc.; 10 mols.) and zinc chloride (6 g.; 2.6 mols.) were heated at 175–180° C. for 3 hours. While still warm, the reaction mixture was treated with acetone (30 cc.). The solid was filtered off when cold, washed with acetone, then with water, then again with acetone, and was finally boiled out with methyl alcohol in which the sand-colored zinc complex of the dianilo compound is scarcely soluble. To convert the complex into the base, it was stirred mechanically with acetone (300 cc.) and 30% (by weight) aqueous sodium hydroxide (90 cc.); after cooling, the acetone layer was separated, filtered and dried over solid sodium hydroxide, and then concentrated. The above-formulated dianilo base was filtered off when cold and recrystallized from methyl alcohol. It was obtained as yellow crystals, M. P. 126° C., which gave a deep yellow spirit solution.

*Example 2.—3-ethyl-2-dianiloisopropylideneben-zothiazoline*

The dianilo base of Example 1 was prepared by heating together 3-ethyl-2-aniloethylidene benzothiazoline (1 mol.) which has the following formula:

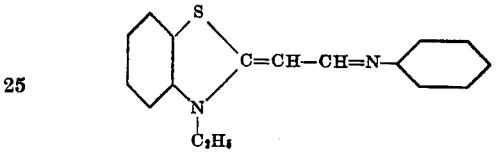

with ethylisoformanilide (10 mols.) and zinc chloride (2.6 mols.), and isolating the dianilo base from the zinc chloride complex as in Example 1.

*Example 3.—5-chloro-3-ethyl-2-dianiloisopropyl-idenebenzthiazoline*

5-chloro-3-ethyl - 2 - methylenebenzthiazoline (24 g.), zinc chloride powder (47 g.), and ethylisoformanilide (170 g.) were heated together in an oil bath at 190° C., with mechanical stirring, for 1½ hours. The reaction mixture was treated with acetone and the solid filtered off, washed with water, and boiled out with methyl alcohol. The resultant zinc chloride complex was ground with 40% sodium hydroxide solution (400 cc.) and water (200 cc.) and extracted with acetone (5000 cc.). The extract was dried with stick sodium hydroxide, the solvent distilled off under a vacuum, and the concentrate cooled, when the base crystallized. It could be recrystallized from methyl alcohol. The yellow crystals had M. P. 187–188° C. with previous shrinking. Abs. max. 4100 Å. in methyl alcohol. The base sensitized a gelatino-silver-chloride photographic emulsion up to 4700 Å.

*Example 4.—3-ethyl-2-dianiloisopropylidene-6:7-benzbenzthiazoline*

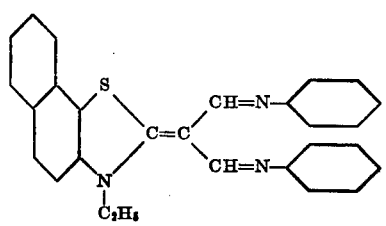

3-ethyl-2-methylene - 6:7 - benzbenzthiazoline, zinc chloride, and ethylisoformanilide were caused to react as in Example 3 and the zinc chloride complex was similarly isolated and converted into base. After recrystallization from methyl alcohol, the dull yellow crystals melted at about 173° C. Abs. max. 3890 Å. in methyl alcohol.

Example 5.—3-ethyl-2-dianiloisopropylidene-benzselenazoline

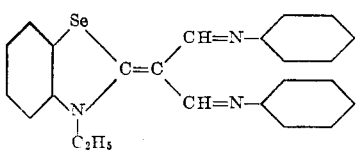

This was prepared from 3-ethyl-2-methylene-benzselenazoline, ethylisoformanilide, and zinc chloride as described in Example 3, and was isolated as zinc chloride complex, whence the base was liberated as in Example 3. The bright yellow crystals had M. P. 140° C. (decomp.) Abs. max. 4070 Å. with an inflexion at 3550, in methyl alcoholic solution.

Example 6.—3-ethyl-2-dianiloisopropylidene-benzselenazoline

This compound (also described in Example 5) was prepared by heating 3-ethyl-2-aniloethylidenebenzselenazoline (20 g.), ethylisoformanilide (44 g.) and zinc chloride (18 g.) at 160-170° C. for 30 minutes. The product was treated with water and the solid then ground and washed with acetone and boiled out with methyl alcohol (1400 cc.). The residual zinc chloride complex was converted to base by treatment with aqueous sodium hydroxide solution and acetone. The filtered acetone extract was dried over stick sodium hydroxide and then concentrated, when the base crystallized.

Example 7.—4-methyl-3-ethyl-2-dianiloisopropylidene-$\Delta^4$-thiazoline

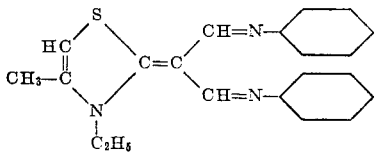

4-methyl-3-ethyl-2-aniloethylidene-$\Delta^4$-thiazoline (48.8 g.), ethylisoformanilide (152 g.) and zinc chloride (80 g.) were heated together at 150-170° C. for 2 hours with mechanical stirring. The crude zinc chloride complex was washed with acetone, and then with water, and was boiled out with methyl alcohol (3200 cc.). The residual zinc chloride complex was converted to base by shaking with aqueous sodium hydroxide solution and acetone. The acetone extract was concentrated to small bulk and the base thrown out by addition of ice water. The golden yellow crystals had M. P. 111° C. (decomp.). Abs. max. 3475 Å. in methyl alcoholic solution.

Example 8.—3-methyl-2-dianiloisopropylidene-thiazolidine

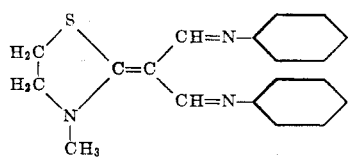

3-methyl-2-aniloethylidenethiazolidine (10.2 g.), ethylisoformanilide (70 c.) and zinc chloride (19.13 g.) were heated together at 175-180° C. for 1½ hours. The viscous mass was treated with acetone (150 cc.). The resultant solid was well washed with water and boiled out four times with methyl alcohol (125 cc.×4.). To liberate the free base from the zinc chloride complex, this complex (8 g.) was ground with acetone (120 cc.) and the mixture cooled with ice and stirred mechanically. An ice-cold solution of sodium (2 g.) in absolute alcohol (120 cc.), and stirring with cooling, were applied for 10 minutes. The solid was filtered off and washed with acetone (16 cc.). The filtrate and washings were poured into ice-cold water, which precipitated the base. It was filtered off and could be recrystallized from light petroleum, B. P. 80-100° C. The lemon yellow crystals had M. P. 127° C. Abs. max. in methyl alcoholic solution 3720 Å.

Example 9.—3-ethyl-2-dianiloisopropylidene-thiazolidine

The zinc chloride complex was prepared as in Example 8 from 3-ethyl-2-aniloethylidenethiazolidine, ethylisoformanilide, and zinc chloride, and was similarly converted into the free base. After recrystallization from light petroleum, B. P. 80-100° C., the bright yellow crystals had M. P. 104° C.

Example 10.—1-ethyl-4-dianiloisopropylidene-1:4-dihydroquinoline

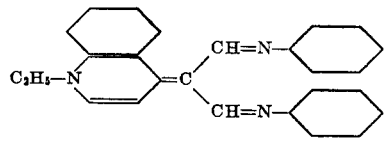

A mixture of 1-ethyl-4-methylene-1:4-dihydroquinoline (10.44 g.), ethylisoformanilide (90.5 cc.), and zinc chloride (25 g.) were heated together at 175-185° C., with mechanical stirring, for 1¼ hours. The reaction mixture was repeatedly warmed with acetone (total 450 cc.) until all lumps had been disintegrated. After filtering off the solid and washing with acetone, it was ground with water and finally boiled out thrice with methyl alcohol (400 cc.×3). The bright orange residue of zinc chloride complex was converted into free base by the method used in Examples 8 and 9. The base was precipitated by water from its alcohol/acetone suspension as a yellow solid, which had become brown before it could be filtered off. After washing with water it was dried in a vacuum desiccator. This crude base was used in subsequent dye condensations. It could however be recrystallized from light petroleum, B. P. 40-60° C. When heated, the light brown powder began to shrink at 90° C.; decomposition was gradual and the substance was quite black by 154° C. but without any definite M. P. The methyl alcoholic solution had absorption maxima at 4785 and 4020 Å.

Example 11.—1-ethyl-2-dianiloisopropylidene-1:2-dihydroquinoline 1-ethyl-2-methylene-1:2-dihydroquinoline was heated as in Example 10 with ethylisoformanilide and zinc chloride; after treatment of the zinc chloride complex with acetone, water, and hot methyl alcohol, it was converted into base by the same method as in Examples 8, 9 and 10. The base was a dirty yellow when first precipitated but darkened. It was possible to recrystallize it from light petroleum, B. P. 80-100° C. The light brown powder had no definite M. P.; shrinking began at about 95° C. and considerable decomposition had occurred by 105° C. The broad absorption curve of a methyl alcoholic solution had its maximum at 4100 Å.

Example 12.—3-ethyl-2-dianiloisopropylidene-benzoxazoline 3-ethyl-2-aniloethylidenebenzoxazoline (106 g.), ethylisoformanilide (300 cc.), and zinc chloride (168 g.) were heated together at 150–160° C. for 1 hour. The reaction mixture was heated with acetone and the solid boiled out with methyl alcohol (1600 cc.). The resultant zinc chloride complex was warmed and shaken with 20% sodium hydroxide solution (7.5 cc. per g.) and acetone (65 cc. per g.). After concentration, the acetone extract was precipitated with aqueous ammonium chloride solution. The base was purified by suspending in spirit (20 cc. per g.) and acidifying with concentrated hydrochloric acid (4 cc. per g.). The filtered solution was treated with ammonia and the precipitated base filtered off and washed. It could be recrystallized from methyl alcohol. The bright yellow crystals had M. P. 210° C. (decomp.). The absorption maximum of a methyl alcoholic solution was at 3755 Å.

Example 13.—[Bis-2-(3-ethylbenzothiazole)][α-β'-dimethin-2'-(3'-ethylbenzthiazole)]trimethincyanine diiodide

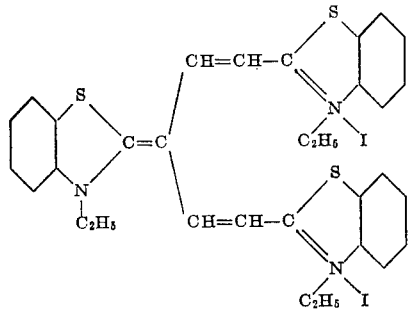

3-ethyl-2-dianiloisopropylidenebenzthiazoline (0.19 g.; 1 mol.), 2-methylbenzthiazole ethiodide (0.31 g.; 2 mols.) and pyridine (2 cc.) were heated together at 130–140° C. for 5 minutes. Dye crystallized even from the hot solution. It was filtered off when cold, washed with pyridine, and with ether, and recrystallized from methyl alcohol, from which it came down as brassy crystals, giving a blue spirit solution. Unlike the better known types of cyanines, this dye is fairly readily soluble in water.

Example 14.—[Bis-2-(3-ethyl-6:7-benzbenzthiazole)][αβ'-dimethin-2'-(3'-ethyl-6':7'-benzbenzthiazole)]trimethin-cyanine diiodide

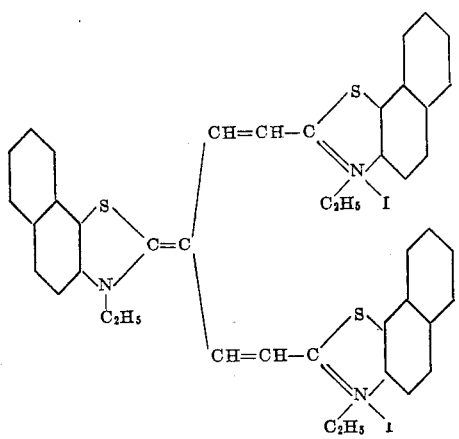

This was prepared as in Example 13, from 3-ethyl-2-dianiloisopropylidene-6:7-benzbenzthiazoline, 2-methyl-6:7-benzbenzthiazole ethiodide, and pyridine. After recrystallization from spirit the dark bronze solid had M. P. 216° C. (decomp.). Abs. max. at 6350 Å. with an inflexion to the curve at 5900 Å. The dye did not sensitize and depressed blue sensitivity.

Example 15.—[Bis-2-(5-chloro-3-ethylbenzthiazole)][αβ'-dimethin-2'-(5'-chloro-3'-ethylbenzthiazole)]trimethincyanine diiodide 5-chloro-3-ethyl-2-dianiloisopropylidenebenzthiazoline (1.56 g.), 5-chloro-2-methylbenzthiazole ethiodide (2.55 g.), anhydrous sodium acetate (1.23 g.), and acetic anhydride (10 cc.) were boiled together in an oilbath at 150° C. for 10 minutes. The cooled mixture was filtered and the solid washed with ether and with water. After recrystallization from methyl alcohol the green crystals had M. P. 240° C. (decomp.). Abs. max. at 6105 Å. The dye strongly depressed the blue sensitivity of a photographic emulsion.

Example 16.—[Bis-2-3-(ethylbenzselenazole)]-[αβ'-dimethin-2'-(3'-ethylbenzselenazole)]-trimethincyanine diiodide Prepared by method of Example 13, but from 3-ethyl-2-dianiloisopropylidenebenzselenazoline, 2-methylbenzselenazole ethiodide, and pyridine, and recrystallized from methyl alcohol. The dull green crystals had M. P. 226° C. (decomp.). Abs. max. at 6200 Å. Strong photographic desensitization.

Example 17.—[Bis-2-(4-methyl-3-ethylthiazole)][αβ'-dimethin-2'-(4'-methyl-3'-ethylthiazole)]trimethincyanine diiodide

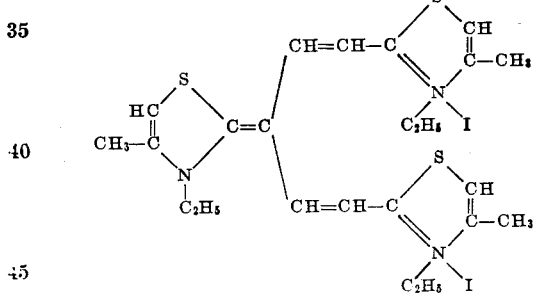

Prepared as in Example 13 from 4-methyl-3-ethyl-2-dianiloisopropylidene-Δ⁴-thiazoline, 2:4-dimethylthiazole etho-p-toluenesulfonate, and pyridine. The pyridine was distilled off under reduced pressure and a spirit solution of the residue treated with an aqueous one of potassium iodide. After recrystallization from absolute alcohol the dark blue crystals had M. P. 206° C. (decomp.). Abs. max. 5875 Å. It sensitized to 7100 Å. with a maximum at 6300 Å. It proved identical with a sample prepared by the empirical method described in United States Patent 1,994,562, dated March 19, 1935.

Example 18.—[Bis-2-(3-methyl-Δ²-thiazoline)][αβ'-dimethin-2'-(3'-methyl-Δ²'-thiazoline)]trimethincyanine diiodide

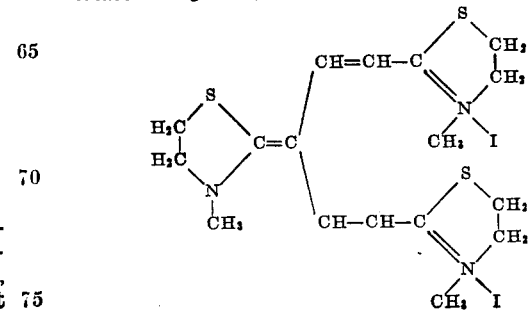

Prepared by heating together 3-methyl-2-dianiloisopropylidenethiazolidine, 2 - methyl - Δ²-thiazoline methiodide, and pyridine as in Example 13. After recrystallization from methyl alcohol, it was obtained as purplish red crystals. When heated, they began to shrink at about 115° C. and had largely melted and decomposed by 125° C. but there was no definite M. P. Abs. max. at 5065 Å. The dye sensitized a gelatino-silver-bromide emulsion up to 5900 Å.

*Example 19.—[Bis - 2 - (3 - ethyl-Δ²-thiazoline)] [αβ'-dimethin - 2' - (3' - ethyl-Δ²'-thiazoline)] trimethincyanine diperchlorate*

This was prepared as in Example 18 but from 3-ethyl-2 - dianiloisopropylidenethiazolidine and 2-methyl-Δ²-thiazoline ethiodide in pyridine. The dye iodide was precipitated by absolute ether and subsequently treated with a solution of sodium perchlorate, to convert it into the corresponding perchlorate. After recrystallization from methyl alcohol the brick red crystals had M. P. 230° C. (decomp.). Abs. max. at 5060 Å. It sensitized a gelatino-silver-bromide emulsion up to 5700 Å.

*Example 20.—[Bis-4-(1-ethylquinoline)][αβ'-dimethin - 4'-(1'-ethylquinoline)] trimethincyanine diiodide*

This was prepared by heating together crude 1-ethyl - 4 - dianiloisopropylidene - 1:4 - dihydroquinoline, lepidine ethiodide, anhydrous sodium acetate, and acetic anhydride. After washing, the dye was recrystallized from methyl alcohol. It proved to be identical with a sample of neocyanine iodide which had been obtained empirically (Hamer, J. Chem. Soc., 1928, 1472).

*Example 21.—[Bis-2-(1-ethylquinoline)][αβ'-dimethin - 2'-(1'-ethylquinoline)] trimethincyanine diperchlorate*

Crude 1-ethyl-2-dianiloisopropylidene-1:2-dihydroquinoline, quinaldine ethiodide, sodium acetate, and acetic anhydride were heated together. The dye iodide was precipitated with absolute ether and washed with ether and with water. It was taken up in hot methyl alcohol and converted into the perchlorate by treatment with aqueous sodium perchlorate solution. On recrystallization from methyl alcohol, it was a very dark green solid. Abs. max. 6795 Å. in methyl alcohol.

*Examples 22.—Bis [2-(1-ethylquinoline)][γβ'-dimethin - 2'-(1'-ethylquinoline)] trimethincyanine diiodide*

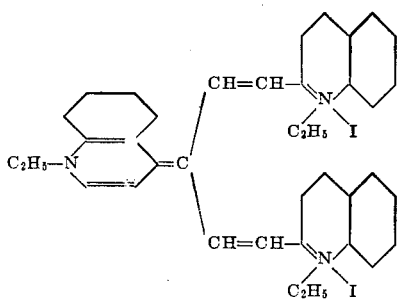

A mixture of crude 1-ethyl-4-dianiloisopropylidene-1:4-dihydroquinoline (0.75 g.), quinaldine ethiodide (1.20 g.), anhydrous sodium acetate (1.31 g.), and acetic anhydride (8 cc.) was heated at 135–140° C. for 10 minutes. The solid was filtered off and washed successively with acetic anhydride, ether, water, and methyl alcohol, and was recrystallized from methyl alcohol (90 cc. per g.). The greenish gold crystals gave off solvent from about 120° C., began to shrink at about 190° C. and had M. P. 264° C. (decomp.). Abs. max. at 6725 Å. in methyl alcohol. The dye showed photographic desensitizing but no sensitizing.

*Example 23.—[4-(1-ethylquinoline)][2-(3-ethyl-Δ²-thiazoline)]-[αβ'-dimethin - 2'(3'-ethyl-Δ²-thiazoline)] trimethincyanine diperchlorate*

This was prepared as in Example 22, but with 2-methyl - Δ² - thiazoline ethiodide instead of quinaldine ethiodide. The dye was precipitated from the reaction mixture with absolute ether and was washed with water. Its solution in methyl alcohol was treated hot with aqueous solution of sodium perchlorate. The dye perchlorate was twice recrystallized from methyl alcohol. The dark blue crystals melted at about 260° C. (decomp.). Abs. max. of methyl alcoholic solution at 5270 Å.

*Example 24.—[4-(1-ethylquinoline)][2-(3-benzthiazole)][αβ'-dimethin - 4' - (1' - ethylquinoline)] trimethincyanine diiodide*

3 - ethyl - 2 - dianiloisopropylidenebenzthiazoline (0.77 g.) lepidine ethiodide (1.20 g.), anhydrous sodium acetate (0.66 g.), and acetic anhydride (4 cc.) were heated together at 140–150° C. for 5 minutes. The product precipitated with absolute ether was washed with water. The resultant tar was caused to crystallize by heating with methyl alcohol (10 cc.). It was recrystallized from methyl alcohol and obtained as coppery crystals, M. P. 221° C. (decomp.), abs. max. 7200 Å. in methyl alcohol. It showed strong desensitization toward a photographic silver halide emulsion.

*Example 25.—[2-(1-ethylquinoline)][2-(3-ethylbenzthiazole)]-[γβ'-dimethin - 2' - (1' - ethylquinoline)] trimethincyanine diiodide*

This was prepared by heating together 3-ethyl-2-dianiloisopropylidenebenzthiazoline, quinaldine ethiodide, and pyridine. The dye was precipitated with absolute ether and heated with methyl alcohol as in Example 24. It was recrystallized from methyl alcohol and obtained as green crystals, M. P. about 249° C. (decomp.), abs. max. in methyl alcoholic solution 6365 Å. The dye sensitized a gelatino-silver-bromide emulsion from 6600–6900 Å.

*Example 26. — [2 - (3 - ethylbenzoxazole)][2-(3-ethylbenzthiazole)] - [γβ' - dimethin - 2 '- (3'-ethylbenzoxazole)]-trimethincyanine diiodide*

This was prepared as in Example 25 but with 2-methylbenzoxazole ethiodide instead of quinaldine ethiodide. The precipitate obtained with ether was heated with methyl alcohol, and the solid was twice recrystallized from methyl alcohol. The bronze crystals had M. P. 236° C. (decomp.). Abs. max. of a methyl alcoholic solution 5400 Å. It sensitized from 5600–6000 Å. and depressed the normal blue sensitivity.

*Example 27. — [2- (3-ethylbenzthiazole)][2-(3-ethylbenzselenazole)] [αβ' - dimethin - 2'- (3'-ethylbenzselenazole)]trimethincyanine diiodide*

3 - ethyl-2-dianiloisopropylidenebenzthiazoline (0.19 g.; 1 mol.), 2-methylbenzselenazole ethiodide (0.35 g.; 2 mols.) and pyridine (2 cc.) were heated together at 135–140° C. for 5 minutes. The dye was filtered off, washed and recrystallized from methyl alcohol, from which it separated as green crystals, giving a blue spirit solution. The dark green crystals had M. P. about 235° C. (decomp.), with previous softening, but dependent upon rate of heating. In methyl alcoholic solution the absorption maximum was at 6155 Å. with a secondary maximum at 5580 Å. The dye showed no sensitizing, but only desensitizing action on a photographic silver halide emulsion.

*Example 28.—[2-(1-ethylquinoline)][2-(3-ethylbenzselenazole)][γβ'-dimethin - 2'- (1'- ethylquinoline)]trimethincyanine diiodide*

3-ethyl-2-dianiloisopropylidenebenzselenazoline (1.72 g.), quinaldine etho-p-toluenesulfonate (3.42 g.), anhydrous sodium acetate (1.32 g.) and acetic anhydride (30 cc.) were heated together at 145–150° C. for 5 minutes. The hot reaction mixture was treated with an aqueous solution of potassium iodide. The crude dye iodide was purified by boiling out with methyl alcohol and the residue was recrystallized from methyl alcohol. The green and gold crystals had M. P. 235° C. (decomp.). Abs. max. 6435 Å. for a methyl alcoholic solution. The dye desensitized a photographic silver halide emulsion.

*Example 29. — [2 - (3 - ethylbenzoxazole)][2-(3-ethylbenzselenazole)] [γβ' - dimethin - 2' - (3'-ethylbenzoxazole)]trimethincyanine diiodide*

Prepared by heating together 3-ethyl-2-dianiloisopropylidenebenzselenazoline, 2 - methylbenzoxazole ethiodide and pyridine, precipitated by absolute ether, and washed with water. By fractional recrystallization from methyl alcohol it was freed from a less soluble impurity. The dark red crystals had M. P. 215° C. (decomp.). Abs. max. at 5965 Å. for a methyl alcoholic solution. It sensitized a gelatino-silver-bromide emulsion from 5400–6100 Å. with the maximum at 5850 Å. and depressed the blue sensitivity.

*Example 30.—[2-(3-ethylbenzthiazole)] [2 - (3 - ethylbenzselenazole)] [γβ'- dimethin - 2' - (3' - ethylbenzthiazole)]trimethincyanine diiodide*

Prepared as in Example 29 but with 2-methylbenzthiazole ethiodide instead of 2-methylbenzoxazole ethiodide. Precipitated, washed, and recrystallized as in Example 29. The dark green crystals had M. P. 235° C. (decomp.). Abs. max. at 6085 Å. for a methyl alcoholic solution. It caused some depression of blue sensitivity of a gelatino-silver-halide emulsion.

*Example 31.—[2-(3-ethyl-6:7-benzbenzthiazole)] [2-(3-ethylbenzselenazole)][γβ'-dimethin - 2'- (3'-ethyl - 6':7' - benzbenzthiazole)]trimethincyanine diiodide*

This was prepared by heating together 3-ethyl-2 - dianiloisopropylidenebenzselenazoline, 2 - methyl-6:7-benzbenzthiazole etho-p-toluenesulfonate, and pyridine, and treating the hot reaction mixture with an aqueous solution of potassium iodide. By fractional crystallization from methyl alcohol a more soluble impurity was removed. The bronze crystals had M. P. 193° C. (decomp.). Abs. max. 6405 Å. for a methyl alcoholic solution. The dye depressed the blue sensitivity of a photographic silver halide emulsion.

*Example 32.—[2-(1:3:3-trimethylindolenine)][2-(3 - ethylbenzselenazole)][γβ' - dimethin - 2' - (1':3':3' - trimethylindolenine)]trimethincyanine diperchlorate*

3-ethyl - 2 - dianiloisopropylidenebenzselenazoline, 2:3:3-trimethylindolenine methiodide, anhydrous sodium acetate, and acetic anhydride were heated together and the reaction mixture was treated with a hot solution of sodium perchlorate. Fractional recrystallization from methyl alcohol removed a more soluble impurity. The dark bluish green crystals had M. P. 252° C. (decomp.). Abs. max. at 6115 Å. with a secondary maximum at 5720 Å. for a methyl alcoholic solution. The dye considerably depressed blue sensitivity of a silver halide emulsion.

*Example 33.—[2-(4-methyl-3-ethylthiazole)][2-(3-ethylbenzthiazole)][αβ'- dimethin - 2' - (3'-ethylbenzthiazole)]trimethincyanine diiodide*

4-methyl-3-ethyl-2-dianiloisopropylidene - Δ⁴-thiazoline, 2-methylbenzthiazole ethiodide, and pyridine were heated together. Dye crystallized and was recrystallized from methyl alcohol. The green and gold crystals had M. P. 247° C. (decomp.). Abs. max. at 6075 Å. for methyl alcoholic solution. The dye sensitized from 5700–6900 Å., with the maximum at 6500 Å. and depressed blue sensitivity of a photographic silver halide emulsion.

*Example 34.—[3-(4-methyl-3-ethylthiazole)][2-(3-ethylbenzselenazole)][αβ'-dimethin-2'- (3'-ethylbenzselenazole)]trimethincyanine diiodide*

This was prepared as in Example 33 but with use of 2-methylbenzselenazole ethiodide instead of 2-methylbenzthiazole ethiodide. After recrystallization from methyl alcohol, it was in the form of emerald green crystals with a golden reflex. M. P. 230° C. (decomp.). Abs. max. 6205 Å. for the methyl alcoholic solution. It sensitized from 6300–6800 Å., with the maximum at 6700 Å., and depressed blue sensitivity of a silver halide emulsion.

*Example 35.—[2-(3-ethyl - Δ²-thiazoline)][2-(3-ethylbenzthiazole)]-[αβ' - dimethin - 2' - (3'-ethylbenzthiazole)]trimethincyanine diiodide*

It was prepared by heating together 3-ethyl-2-dianiloisopropylidenethiazolidine (1.12 g.), 2-methylbenzthiazole ethiodide, and pyridine, and crystallized on cooling. The washed product was boiled out with, and recrystallized from, methyl alcohol (10 cc., 1070 cc.). The green and gold crystals had M. P. 237° C. (decomp.). Abs. max. at 6070 Å. for a methyl alcoholic solution.

*Example 36.—[4-(1-ethylquinoline)][2-(3-ethyl-Δ²-thiazoline)]-[γβ'-dimethin-4' - (1' - ethylquinoline)] trimethincyanine diiodide*

This was prepared by heating together 3-ethyl-2-dianiloisopropylidenethiazolidine, lepidine ethiodide, anhydrous sodium acetate, and acetic anhydride at 130–140° C. for 2 minutes. The crystalline dye was filtered off, washed, and boiled out with, and recrystallized from, methyl alcohol. The golden crystals melted at 272° C. (decomp.). Abs. max. at 7440 Å. in methyl alcoholic solution.

*Example 37.—[5-(3-ethylrhodanine)][2-(3-ethylbenzthiazole)][β-methin-5' - (3'-ethylrhodanine)]dimethinmerocyanine*

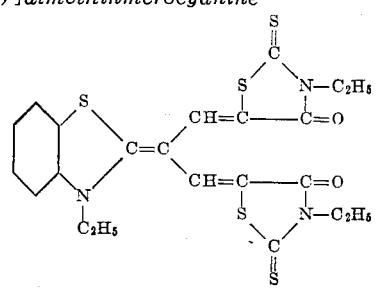

3-ethyl - 2-dianiloisopropylidenebenzthiazoline (0.77 g.; 1 mol.), 3-ethylrhodanine (0.97 g.; 3 mols.), anhydrous sodium acetate (0.98 g.; 12 mols.) and acetic anhydride (10 cc.) were heated together at 140–150° C. for 10 minutes. The cooled reaction mixture was treated with absolute ether (40 cc.). The crude dye was filtered off, washed with ether, ground with water and recrystallized from pyridine. The green and gold crystals had M. P. 229° C. with previous shrinking. A methyl alcoholic solution showed a broad absorption band with maxima at 5090 Å., 5225, 5350 and 5600. The dye desensitized a photographic silver halide emulsion.

*Example 38.*—*[5-(3-ethylrhodanine)][2-(3-ethylbenzselenazole)][β-methin-5'-(3' - ethylrhodanine)]dimethinmerocyanine*

3-ethyl-2-dianiloisopropylidenebenzthiazoline line (1.08 g.; 1 mol.), 3-ethylrhodanine (1.21 g.; 3 mols.), and anhydrous sodium acetate (0.82 g.; 4 mols.) in acetic anhydride (15 cc.) were heated together at 145° C. for 7 minutes. Solid was precipitated from the chilled reaction mixture by addition of ether, and was filtered off. The crude dye was washed with water, dried, and recrystallized from a mixture of equal volumes of pyridine and ethyl alcohol. The dark green solid had a gold reflex and M. P. 206° C. (decomp.). Abs. max. at 5300 Å. in methyl alcohol solution. The dye imparted a trace of photographic sensitization to a silver halide emulsion with maximum at about 5850 Å. and depressed the normal sensitivity of the emulsion.

*Example 39.*—*[5-(4-keto-2-thio - 3-ethyltetrahydro - oxazole)][2 - (3-ethylbenzselenazole)][β-methin-5'-(4'-keto-2'-thio-3'-ethyltetrahydrooxazole)]dimethinmerocyanine*

Prepared as in Example 38, but replacing the 3-ethylrhodanine with an equivalent amount of 4-keto-2-thio-3-ethyltetrahydro-oxazole. The dye was recrystallized from a mixture of pyridine and ethyl alcohol (1:1). The scarlet crystals had M. P. 231° C. (decomp.). Their methyl alcoholic solution had a broad absorption curve with its principal maximum at 5000, one slightly weaker at 5100, and a shoulder at 5300 Å. In a gelatino-silver-bromide emulsion, the dye reduced the normal sensitivity, but caused extra sensitivity to 6200 Å. with the maximum at 5550 Å.

*Example 40.*—*[2-(4-methyl-3-ethylthiazole)][5-(3-ethylrhodanine)][α-methin-5' - (3' - ethylrhodanine)] dimethinmerocyanine*

Prepared from 4-methyl-3-ethyl-2-dianiloisopropylidene-Δ⁴-thiazoline, 3-ethylrhodanine, and pyridine. The crude dye was precipitated with water and was caused to solidify by treatment with spirit. Recrystallization from pyridine gave greyish blue crystals of M. P. 223° C. (decomp.). The narrow absorption curve of a methyl alcoholic solution had its maximum at 5720 Å. and an inflexion at 5220. The substance considerably reduced the blue sensitivity of a photographic silver halide emulsion and weakly sensitized to 6600 Å. with the maximum at 6450. Instead of pyridine as condensing agent in the preparation, anhydrous sodium acetate in acetic anhydride could be used.

*Example 41.*—*[5-(4-keto-2-thio-3-ethyltetrahydro-oxazole)][2-(4-methyl - 3-ethylthiazole)][β-methin-5'-(4'-keto-2'-thio - 3' - ethyltetrahydro-oxazole)] dimethinmerocyanine*

4-methyl-3-ethyl-2-dianiloisopropylidene - Δ⁴-thiazoline (1.39 g.), 4-keto-2-thio-3-ethyltetrahydro-oxazole (1.74 g.), anhydrous sodium acetate (1.31 g.) and acetic anhydride (20 cc.) were heated together at 145–150° C. for 7 minutes. The mixture was poured into water. The resultant tarry solid was caused to solidify by treatment with spirit. After recrystallization from methyl alcohol the compound consisted of dark purple crystals, M. P. 189° C. (decomp.). The narrow absorption curve of a methyl alcoholic solution had its maximum at 5350 Å. and an inflexion at 5000. It sensitized a gelatino-silver-bromide emulsion very weakly to 5700 Å., the maximum being at 5400, and it considerably depressed the normal sensitivity of the emulsion.

*Example 42.* — *[5- ( 3 - ethylrhodanine)][2 - (5-chloro - 3 - ethylbenzthiazole)][β - methin - 5'-(3'-ethylrhodanine)]dimethinmerocyanine*

5 - chloro - 3 - ethyl - 2 - dianiloisopropylidenebenzthiazoline (2.60 g.), 3-ethylrhodanine (3.15 g.), and pyridine (25 cc.) were heated together at 130–135° C. for 5 minutes. The dye was precipitated with water, and filtered off; more was extracted from the filtrate with ether and precipitated from the concentrated extract with water. After recrystallization from pyridine the bronze powder had M. P. 128–130° C. (decomp.), with previous shrinking. The methyl alcoholic solution had a broad absorption curve with maximum at 5080 Å. The dye weakly sensitized a gelatino-silver-bromide emulsion from 5500–5900 Å., with strong depression of the blue sensitivity.

*Example 43.*—*[5-(1 - phenyl - 3 - ethyl - 2 - thiohydantoin)][2 - (5 - chloro - 3 - ethylbenzthiazole)][β - methin-5' - (1' phenyl - 3' - ethyl-2'-thiohydantoin)] dimethinmerocyanine*

5 - chloro - 3 - ethyl - 2 - dianiloisopropylidenebenzthiazoline (3.12 g.), 1-phenyl-3-ethyl-2-thiohydantoin (4.96 g.), anhydrous sodium acetate (3.72 g.), and acetic anhydride (20 cc.) were heated together at 140-150° C. for 10 minutes. The reaction mixture was treated with absolute ether and the sodium acetate was filtered off. The ether was distilled off from the filtrate and the residue treated with water. The resultant product by two crystallizations from methyl alcohol was obtained as dark green crystals, M. P. 174° C. (decomp.). Abs. max. 5180 Å. in methyl alcohol. The dye decreased the normal sensitivity of a gelatino-silver-bromide emulsion but sensitized up to 6700 with the maximum at 6150 Å.

*Example 44.*—*[5 - (2 - diphenylamino - 4 - keto-Δ² - thiazoline)][2 - (5 - chloro - 3 - ethylbenzthiazole)][β-methin-5'-(2'-diphenylamino-4'-keto-Δ²-thiazoline)]dimethinmerocyanine*

This was similarly prepared except that the 1-phenyl-3-ethyl-2-thiohydantoin of Example 43 was replaced by 2-diphenylamino-4-keto-Δ²-thiazoline. The cooled reaction mixture was treated with absolute ether and the resultant solid was ground with water. After recrystallization from pyridine it was obtained as a terracotta powder, M. P. 193–194° C. (decomp.). Abs. max. 4955 Å. The dye produced no sensitization of a silver halide emulsion but slight depression of blue sensitivity.

*Example 45.—[5-(4-keto-2-thio-3-ethyltetrahydro-oxazole)][2-(3-methyl-Δ²-thiazoline)][β-methin-5'-(4-keto-2'-thio-3'-ethyltetrahydrooxazole)]dimethinmerocyanine*

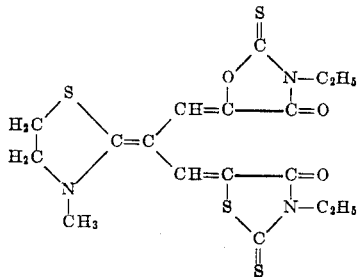

3-methyl - 2 - dianiloisopropylidenethiazolidine (1.61 g.), 4-keto-2-thio-3-ethyltetrahydro-oxazole (1.60 g.), anhydrous sodium acetate (2.46 g.), and acetic anhydride (8 cc.) were heated together at 130–140° C. for 5 minutes. The solids were filtered off when cold, washed with ether, and ground with water, and the resultant dye was recrystallized from pyridine. It was a reddish orange solid, M. P. about 229° C. with previous darkening and shrinking. There were two absorption maxima of a methyl alcoholic solution, the stronger one lying at 4455 Å. and another at 5030.

*Example 46.—[4-(1-ethylquinoline)][2-(3-ethylbenzthiazole)]γ - anilomethyltrimethincyanine iodide*

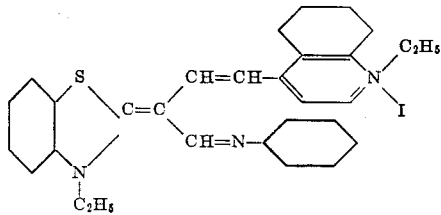

3 - ethyl - 2 - dianiloisopropylidenebenzthiazoline (3.07 g.) and lepidine ethiodide (2.40 g.) were mixed, treated with pyridine (16 cc.) and heated for 10 minutes at 60–70° C. The dye was precipitated with ether, well washed with water, and washed with ether in a Soxhlet apparatus. By recrystallization from methyl alcohol it was obtained as a dark green powder, M. P. 218–219° C. (decomp.). The blue methyl alcoholic solution became flame colored on acidification. Abs. max. of an ammoniacal methyl alcoholic solution was at 6030 Å., whilst one containing sulfuric acid had abs. max. at 5000 Å. It was a photographic desensitizer.

*Example 47.—[2-(1-ethylquinoline)][2-(3-ethylbenzthiazole)]-γ-anilomethyltrimethincyanine iodide*

3 - ethyl - 2 - dianiloisopropylidenebenzthiazoline (0.77 g.; 1 mol.) and a quinaldine (0.6 g.; 1 mol.) were ground together and pyridine (4 cc.) was added. The mixture was heated for 10 minutes in a glycerine bath at 60–69° C. The reaction mixture was cooled and the product precipitated with absolute ether. It was filtered off and washed with ether. It was ground with water, filtered and dried. It was then extracted with ether in a Soxhlet apparatus. The residue was recrystallized from methyl alcohol. The dark maroon crystals had M. P. about 210° C. (decomp.). Abs. max. of ammoniacal methyl alcoholic solution at 5150 Å., while a sulfuric acid methyl alcoholic solution had its maximum at 4750 Å. Sensitized a photographic gelatino-silver-bromide emulsion weakly, with the maximum 6000 Å. and strong blue depression. This preparation can be effected in boiling absolute alcohol for 1 minute, instead of in warm pyridine for 10 minutes.

*Example 48.—Bis - 2 - (3-ethylbenzthiazole)-α-anilomethyltrimethincyanine iodide*

3 - ethyl-2-dianiloisopropylidenebenzthiazoline (0.19 g.; 1 mol.) and 2-methylbenzthiazole ethiodide (0.15 g.; 1 mol.) were ground together and pyridine (1 cc.) was added. Reaction occurred even in the cold, as indicated by development of a red color. The mixture was heated for 5 minutes in a glycerine bath at 60–67° C. It was cooled and the product was precipitated by adding ether. The precipitated product was ground with water, dried and extracted with ether in a Soxhlet apparatus. The extracted dye was recrystallized from methyl alcohol. The dark maroon powder had an indefinite M. P. at about 210° C., with decomp. from 180° C. A methyl alcoholic solution containing pyridine had its abs. max. at 5515 Å., and one containing sulfuric acid its max. at 4695. There was no photographic sensitization but depression of the normal blue sensitivity.

*Example 49.—[2 - (3-ethyl-Δ²-thiazoline)][2-(3-ethylbenzthiazole)] - γ-anilomethyltrimethincyanine iodide*

3 - ethyl-2-dianiloisopropylidenebenzthiazoline (0.77 g.) and 2-methyl-Δ²-thiazoline ethiodide (0.62 g.) were stirred together in ice-cold pyridine (4 cc.). After six hours in ice, the red solution was treated with ice-cold water. The resultant red oil solidified and was washed, then recrystallized from absolute alcohol. The bright red crystals began to shrink at about 80° C. and to darken at about 100° C.; considerable decomposition occurred from 125–130° C. but there was no definite M. P. A methyl alcoholic solution containing pyridine had abs. max. at 4005 and 4905 Å. One containing sulfuric acid had the max. at 4235. The dye weakly sensitized a gelatino-silver-chloride emulsion to 5000 Å., with max. at 4500.

*Example 50.—[4 - (1 - ethylquinoline)][2 - (4-methyl - 3 - ethylthiazole)]-γ-anilomethyltrimethincyanine iodide*

4 - methyl-3-ethyl-2-dianiloisopropylidene-Δ⁴-thiazoline (1.16 g.), lepidine ethiodide 1.0 g.), and pyridine (15 cc.) were heated together at 100° C. for 4 minutes. The dye was precipitated with ether, washed with water, and recrystallized from methyl alcohol. The dark green crystals had M. P. 211° C. (decomp.). An ammoniacal methyl alcoholic solution had its abs. max. at 5720 Å. and one containing sulfuric acid has its max. at 5010 Å. The dye sensitized weakly a gelatino-silver-bromide emulsion to 5500 Å. with slight depression of the normal sensitivity.

*Example 51.—[2 - (1 - ethylquinoline)][2-(4-methyl - 3 - ethylthiazole)]-γ-anilomethyltrimethincyanine iodide*

This preparation was similar to that of Example 50, except that quinaldine etho-p-toluenesulfonate was used instead of lepidine ethiodide. The crude dye was precipitated with ether and the sticky solid was dissolved in hot spirit and converted into dye iodide by treatment with aqueous potassium iodide solution. The dye was twice recrystallized from methyl alcohol. The purple crystals had M. P. 217° C. (decomp.), An ammoniacal methyl alcoholic solution had abs. max. at 5060 Å. and one containing sulfuric acid had max. at 4815 Å. On a gelatino-silver-chloride emulsion, it conferred sensitivity as far as 5900 with the maximum at 5250 Å.

*Example 52.—[2-(3-ethyl-$\Delta^2$-thiazoline)][2-(4-methyl - 3 - ethylthiazole)]-γ-anilomethyltrimethincyanine iodide*

This was similar to Example 50, except that 2-methyl-$\Delta^2$-thiazoline ethiodide was used and heating was for 7 minutes. The sticky solid, precipitated by ether, hardened on treatment with cold water. It was recrystallized from absolute alcohol. The orange powder had M. P. 163° C. (decomp.). A methyl alcoholic solution containing pyridine had abs. max. at 4170 Å. but one containing sulfuric acid had abs. max. at 4265 Å., so that these results seem anomalous. To a gelatino-silver-chlorobromide emulsion it gave very weak sensitization with the maximum at 5300 Å.

*Example 53.—[4-(1-ethylquinoline)][2-(3-ethyl-$\Delta^2$-thiazoline)] - γ - anilomethyltrimethincyanine iodide*

3 - ethyl - 2 - dianiloisopropylidenethiazolidine (4.48 g.), lepidine ethiodide (4.4 g.), and absolute ethyl alcohol (160 cc.) were mixed at 0° C. and kept at this temperature for an hour. The washed product was recrystallized from methyl alcohol. Its dark green crystals had M. P. 133° C. (decomp.). A methyl alcoholic solution containing pyridine had its abs. max. at 5810 Å. and one containing sulfuric acid had the max. at 4950 Å.

*Example 54.—[2-(3-ethyl-$\Delta^2$-thiazoline)][2-(3-ethylbenzthiazole)]-α - anilomethyltrimethincyanine iodide.*

This was prepared as in Example 53, with 2-methylbenzthiazole ethiodide taking the place of the lepidine ethiodide. The brick red crystals had M. P. 110° C. (decomp.). A methyl alcoholic solution containing pyridine had its abs. max. at 5100 Å. whilst that of one containing sulfuric acid was at 4725 Å.

*Example 55.—[Bis - 2-(3-ethyl-$\Delta^2$-thiazoline)]α-anilomethyltrimethincyanine perchlorate*

This was prepared, similarly to Example 53, from 3 - methyl-2-dianiloisopropylidenethiazolidine and 2-methyl-$\Delta^2$-thiazoline methiodide, in ice-cold pyridine. The dye iodide was precipitated with ice-cold water, washed with ether, taken up in hot absolute alcohol and converted into perchlorate by treatment with a hot aqueous solution of sodium perchlorate. This was recrystallized from methyl alcohol and obtained as orange crystals, M. P. 148° C. (decomp.), with previous darkening and shrinking. Abs. max. of a methyl alcoholic solution containing pyridine was at 4500 Å. and one containing sulfuric acid had its abs. max. at 4370 Å.

*Example 56.—[Bis-2-(3-ethylbenzthiazole)][αβ'-dimethin-2'-(3'-ethylbenzselenazole)]trimethincyanine diiodide*

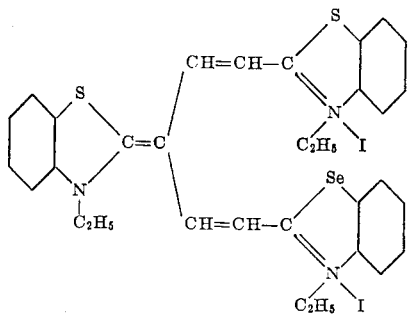

[Bis-2-(3-ethylbenzthiazole)]α - anilomethyltrimethincyanine iodide (0.30 g.; 1 mol.), 2-methylbenzselenazole ethiodide (0.18 g.; 1 mol.) and anhydrous sodium acetate (0.13 g.; 4 mols.) were ground together with acetic anhydride (2 cc.) and heated at 140–150° C. for 5 minutes. The dye separated from the reaction mixture. It was filtered off, washed with ether and then with a little water and was recrystallized from methyl alcohol. When heated, the dark green crystals of dye decomposed at about 234° C., but depending upon the rate of heating. Abs. max. of methyl alcoholic solution at 6100 Å. It strongly desensitized photographically and did not sensitize.

*Example 57.—[2-(1-ethylquinoline)][2-(3-ethylbenzthiazole)][γβ'-dimethin-2'-(3'-ethylbenzthiazole)]trimethincyanine diiodide*

[2-(1-ethylquinoline)][2 - (3 - ethylbenzthiazole)]γ - anilomethyltrimethincyanine iodide (1.18 g.), 2-methylbenzthiazole ethiodide (0.61 g.), anhydrous sodium acetate (0.65 g.) and acetic anhydride (8 cc.) were heated together at 140–150° C. for 2 minutes. The solid was filtered off when cold, washed with ether, ground with water, and recrystallized from methyl alcohol. The bronze crystals had M. P. 228° C. (decomp.). Abs. max. of methyl alcoholic solution at 6110 Å. The dye desensitized a gelatino-silver-bromide photographic emulsion and did not sensitize.

*Example 58.—[4-(1-ethylquinoline)][2-(3-ethylbenzthiazole)][γβ' - dimethin-2' - (3' - ethylbenzthiazole)]trimethincyanine diiodide*

[4-(1 - ethylquinoline)][2-(3 - ethylbenzthiazole)]γ - anilomethyltrimethincyanine iodide (1.18 g.), 2-methylbenzthiazole ethiodide (1.84 g.), anhydrous sodium acetate (1.0 g.) and acetic anhydride (15 cc.) were heated together at 140–150° C. for 8 minutes. The reaction mixture was worked up as in Example 57 and the dye fractionally recrystallized from methyl alcohol. The bronze powder had M. P. 210–212° C. (decomp.), with previous softening. Abs. max. of methyl alcoholic solution at 6480 Å.

*Example 59.—[Bis-2 - (3-ethyl-$\Delta^2$ - thiazoline)]-[αβ' - dimethin - 2' - (3' - ethylbenzthiazole)]-trimethincyanine diperchlorate*

[2-(3-ethyl - $\Delta^2$ - thiazoline)][2-(3-ethylbenzthiazole)]α-anilomethyltrimethincyanine iodide (1.82 g.), 2-methyl-$\Delta^2$-thiazoline ethiodide (1.71 g.), and pyridine (15 cc.) were heated together at 120° C. for 3 minutes. Absolute ether precipitated a sticky solid, which was dissolved in hot spirit and treated with a hot aqueous solution of sodium perchlorate (1.9 g.). The washed dye was recrystallized from methyl alcohol, being freed from a residue. The green crystals had a gold reflex. M. P. 235° C. (decomp.). Abs. max. at 5580 Å. for the methyl alcoholic solution.

*Example 60.*—[2-(1-ethylquinoline)] [2-(3-ethylbenzthiazole)] [γβ'-dimethin-4'-(1'-ethylquinoline)] trimethincyanine diiodide

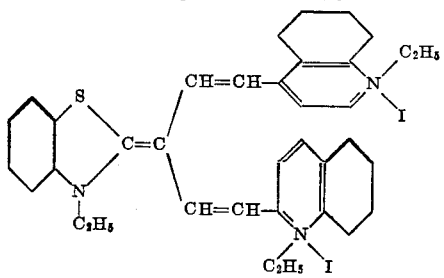

[4-(1-ethylquinoline)] [2-(3 - ethylbenzthiazole)]γ-anilomethyltrimethincyanine iodide (1.18 g.), quinaldine ethiodide (0.60 g.), anhydrous sodium acetate (0.66 g.) and acetic anhydride (5 cc.) were heated together at 140–150° C. for 10 minutes. The reaction mixture was treated with anhydrous ether and the resultant solid well washed with water and recrystallized from methyl alcohol. The brownish bronze crystalline powder had M. P. 253° C. (decomp.). Its methyl alcoholic solution had its abs. max. at 6730 Å. The dye caused weak sensitization and strong desensitization of a gelatino-silver-bromide photographic emulsion.

*Example 61.*—The dye of Example 60 was also prepared by heating together [2-(1-ethylquinoline)] [2-(3-ethylbenzthiazole) [γ - anilomethyltrimethincyanine iodide, lepidine ethiodide, sodium acetate, and acetic anhydride. The crude product was isolated and purified as before.

*Example 62.*—[2-(1-ethylquinoline)] [2-(3-ethylbenzthiazole)] [γβ'-dimethin - 2' - (3' - ethylbenzselenazole)]trimethincyanine diiodide

[2-(1-ethylquinoline)] [2 - (3 - ethylbenzthiazole)]γ-anilomethyltrimethincyanine iodide (0.29 g.; 1 mol.), 2-methylbenzthiazole ethiodide (0.18 g.; 1 mol.) and anhydrous sodium acetate (0.16 g.; 4 mols.) were ground together with acetic anhydride (2 cc.) and heated at 140–150° C. for 2 minutes. The original bluish purple color changed to blue and dye crystallized even from the hot reaction mixture. After cooling, the dark green solid was filtered off and washed, first with ether and then with a little water. The dye was recrystallized from methyl alcohol and gave a blue spirit solution.

*Example 63.*—[4-(1-ethylquinoline)][2-(3-ethyl-Δ²-thiazoline)] [γβ' - dimethin - 2'-(3'-ethylbenzthiazole)]trimethincyanine diiodide

[4-(1-ethylquinoline)][2-(3 - ethyl-Δ²-thiazoline)] γ - anilomethyltrimethincyanine iodide (1.35 g.), 2-methylbenzthiazole ethiodide (0.84 g.), and pyridine (20 cc.) were boiled together for 2 minutes. The washed solid was recrystallized from methyl alcohol and obtained as gold crystals, M.P. 242° C. (decomp.). Abs. max. of methyl alcoholic solution at 6555 Å.

*Example 64.*—[2-(3-ethyl-Δ²-thiazoline)] [2-(4-methyl-3-ethylthiazole)] [γβ'-dimethin-2'-(3'-ethyl - Δ²-thiazoline)]trimethincyanine diperchlorate

[2-(3-ethyl-Δ² - thiazoline)] [2-(4-methyl-3-ethylthiazole)] γ - anilomethyltrimethincyanine iodide (1.28 g.), 2-methyl-Δ²-thiazoline ethiodide (0.99 g.), anhydrous sodium acetate (0.82 g.), and acetic anhydride (20 cc.) were heated together at 140–150° C. for 5 minutes. Precipitation with absolute ether was carried out and the product washed with water. The sticky residue was dissolved in hot spirit and treated with a hot aqueous sodium perchlorate solution. The dye perchlorate was recrystallized from methyl alcohol and obtained as maroon crystals, M. P. 220° C. (decomp.). Abs. max 5050 Å. for a methyl alcoholic solution. It sensitized a gelatino-silver-bromide photographic emulsion to 5800 Å. with the maximum at 5300.

*Example 65.*—[5-(3-ethylrhodanine)][2-(3-ethylbenzthiazole)]β - anilomethyldimethinmerocyanine

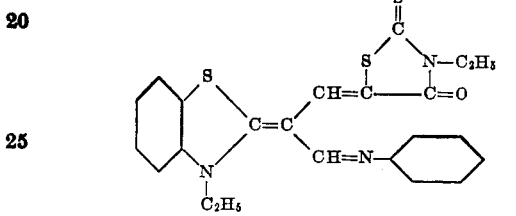

3-ethyl-2 - dianiloisopropylidenebenzthiazoline (0.77 g.; 1 mol.) and 3-ethylrhodanine (0.97 g.; 3 mols.) were mixed and pyridine (4 cc.) added. The mixture was heated in a glycerine bath at 60–65° C. for 1 minute. The mixture was cooled and absolute ether (20 cc.) added. The red solid was filtered off, washed with absolute ether and recrystallized from pyridine, a second crop of crystals being obtained upon the addition of ether to the pyridine mother liquor. When heated the red crystals began to blacken at about 175° C., were quite black and shrunken at 185° C., and melting at about 195° C. (decomp.). An ammoniacal methyl alcoholic solution had its absorption maximum at 5230 Å. while one containing sulfuric acid had the maximum at 4400 Å. The dye sensitized a gelatino-silver-bromide emulsion to 6420 Å., the maximum lying at 5700.

*Example 66.*—[5-(4-keto-2-thio-3-ethyltetrahydro - oxazole)][2 - (3 - ethylbenzthiazole)]β - anilomethyldimethinmerocyanine 3-ethyl - 2-dianiloisopropylidenebenzthiazoline (3.83 g.), 4-keto-2-thio-3-ethyltetrahydro-oxazole (2.90 g.) and pyridine (20 cc.) were heated together at 50–63° C. for 30 minutes. The cooled reaction mixture, from which dye crystallized, was treated with absolute ether. The dye was filtered off, washed with ether, and purified by boiling out with methyl alcohol. The red residue began to darken at about 195° C. and melted at about 208° C. (decomp.). Abs. max. of ammoniacal methyl alcoholic solution at 4975 Å., while methyl alcoholic solution containing sulfuric acid had abs. max. at 4100 Å. It sensitized a gelatino-silver-chloride emulsion to 5400 Å. with the maximum at 4800.

*Example 67.* — [5-(1-phenyl-3-ethyl-2-thio-hydantoin)][2-(5-chloro-3-ethylbenzthiazole)] - β-anilomethyldimethinmerocyanine 5-chloro-3-ethyl-2-dianiloisopropylidenebenz - thiazoline (1.56 g.), 1-phenyl-3-ethyl-2-thiohydantoin (2.48 g.) and pyridine (15 cc.) were heated together at 130–135° C. for 5 minutes. The product was precipitated by water, and boiled out twice with methyl alcohol. The residue was taken up in hot acetic acid and the cooled filtrate precipitated with ether. The brick red powder had M. P. 242–243° C. (decomp.), with shrinking from 137° C. A methyl alcoholic solution containing ammonia had its abs. max. at 5110 Å. and one containing sulfuric acid had its abs. max. at 4300. The dye sensitized a gelatino-silver-chloride emulsion to 6000 Å. with the maximum at 5500.

*Example 68.* — [5-(2-diphenylamino-4-keto-$\Delta^2$-thiazoline)][2 - (5-chloro - 3 - ethylbenzthiazole)]β-anilomethyldimethinmerocyanine 5-chloro-3-ethyl-2 - dianiloisopropylidenebenzthiazoline (1.04 g.), 2-diphenylamino-4-keto-$\Delta^2$-thiazoline (2.02 g.) and pyridine (10 cc.) were heated together in a steam bath for 1 minute. The dye was precipitated with ether and recrystallized twice from methyl alcohol. The bright yellow powder had M. P. 245° C. (decomp.). An ammoniacal methyl alcoholic solution had its abs. max. at 4835 Å. One containing sulfuric acid had its abs. max. at 4250 Å. It sensitized a chloro-silver-bromide emulsion to 5900 Å. with the maximum at 5200.

*Example 69.* — [5-(3 - ethylrhodanine)][2-(3 - ethylbenzselenazole)]β - anilomethyldimethinmerocyanine 3-ethyl-2 - dianiloisopropylidenebenzselenazoline (0.86 g.), 3-ethylrhodanine (0.96 g.) and pyridine (5 cc.) were heated together at 120° C. for 3 minutes. The product, precipitated by means of absolute ether, was recrystallized from a mixture of pyridine and methyl alcohol (1:1). The lustrous vermilion crystals had M. P. 197° C. (decomp.). An ammoniacal methyl alcoholic solution had abs. max. at 5100 Å. One containing sulfuric acid had its abs. max. at 4400. The dye sensitized a washed gelatino-silver-chloride emulsion, the maximum lying at 5700 Å. and sensitization extending to 6300.

*Example 70.*—[5-(4-keto-2-thio - 3 - ethyltetrahydro - oxazole)][2 - (3-ethylbenzselenazole)]β-anilomethyldimethinmerocyanine In place of the 3-ethylrhodanine in Example 69, there was used 4-keto-2-thio-3-ethyltetrahydro-oxazole. The dye was isolated as in Example 69. It was recrystallized from a mixture of pyridine and ethyl alcohol (1:1). The bright orange crystals had M. P. 161° C. (decomp.). An ammoniacal methyl alcoholic solution had its abs. max. at 4850 Å. and one containing sulfuric acid had its abs. max. at 4105. The dye sensitized a gelatino-silver-chlorobromide emulsion to 5900 Å. with the maximum at 5400.

*Example 71.*—[5-(1-phenyl-3-ethyl - 2 - thiohydantoin)][2-(3-ethylbenzselenazole)]β - anilomethyldimethinmerocyanine In place of the ethylrhodanine in Example 69, there was used 1-phenyl-3-ethyl-2-thiohydantoin. The red reaction mixture was poured into water. The aqueous liquid was decanted off and the sticky residue boiled out with methyl alcohol. The residual dye was recrystallized from pyridine. The brick red crystals had a gold reflex. M. P. 236° C. (decomp.). An ammoniacal methyl alcoholic solution had its abs. max. at 5055 Å. and one containing sulfuric acid had the max. at 4290 Å. The dye sensitized a gelatino-silver-chloride emulsion to 6150 Å. with the max. at 5600.

*Example 72.*—[2-(4-methyl- 3 -ethylthiazole)][5-(3-ethylrhodanine)]- α- anilomethyldimethinmerocyanine 4-methyl- 3 -ethyl-2-dianiloisopropylidene-$\Delta^4$-thiazoline (0.69 g.), 3-ethylrhodanine (0.48 g.), and absolute ethyl alcohol (7 cc.) were boiled and stirred together for 2 minutes. The resultant dye was filtered off when cold and was recrystallized from a mixture of pyridine and absolute ethyl alcohol (2:5). The crimson crystals had M. P. 182° C. (decomp.). An ammoniacal methyl alcoholic solution had its abs. max. at 4085 Å. and a secondary crest at 4830. One containing sulfuric acid had its abs. max. at 4465 Å. The dye sensitized a gelatino-silver-chloride emulsion to 6400 Å. with the maximum at 5850.

*Example 73.*—[5-(4-keto-2-thio- 3 -ethyltetrahydro-oxazole)][2-(4-methyl-3 - ethylthiazole)]-β-anilomethyldimethinmerocyanine 4-methyl-3-ethyl- 2 -dianiloisopropylidene- $\Delta^4$-thiazoline (1.74 g.), 4-keto-2-thio-3-ethyltetrahydro-oxazole (1.6 g.) and pyridine (10 cc.) were heated together at 130° C. for 10 minutes. The reaction mixture was poured into water. The aqueous layer was decanted off and the sticky solid boiled out with absolute ethyl alcohol. The residue was recrystallized from methyl alcohol. The bright orange crystals had M. P. 155° C. (decomp.). An ammoniacal methyl alcoholic solution had its abs. max. at 4510 Å. One containing sulfuric acid had its abs. max. at 4150. The dye sensitized a gelatino-silver-chloride emulsion to 5700 Å., the maximum lying at 5200.

*Example 74.*—[5-(1-phenyl- 3 -ethyl- 2 -thiohydantoin)][2-( 4 - methyl- 3 -ethylthiazole)]β-anilomethyldimethinmerocyanine 4-methyl-3-ethyl- 2 -dianiloisopropylidene-$\Delta^4$-thiazoline (3.47 g.), 1-phenyl-3-ethyl-2-thiohydantoin (3.3 g.), and absolute ethyl alcohol (20 cc.) were boiled together for 3 minutes. The solid was filtered off and purified by boiling out twice with methyl alcohol.

*Example 75.*—The dye of Example 74 was prepared by heating the reactants for 4 minutes in pyridine at 130° C., instead of using ethyl alcohol. The solution was poured into water and the crude product thus obtained was purified by boiling out with methyl alcohol and then recrystallized from pyridine. The maroon and gold crystals had M. P. 222° C. (decomp.). An ammoniacal methyl alcoholic solution had its abs. max. at 4860 Å. and one containing sulfuric acid had the max. at 4470 Å. The dye sensitized a gelatino-silver-chloride emulsion up to 5200 Å. with the maximum at 4850.

*Example 76.*—[5-(4-keto- 2 -thio-3-ethyltetrahydro - oxazole)][2 - (3 - ethylbenzthiazole)][β-methin-5'-(3'-ethylrhodanine)]dimethinmerocyanine

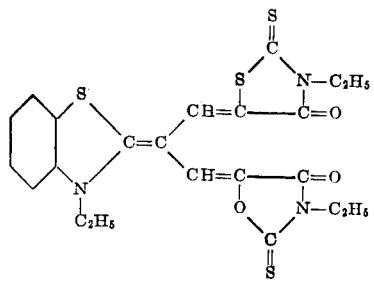

[5-(3 - ethylrhodanine)][2 - (3-ethylbenzthiazole)]-β-anilomethyldimethinmerocyanine (0.45 g.; 1 mol.), 4-keto-2-thio- 3 -ethyltetrahydro-oxazole (0.29 g.; 2 mols.), anhydrous sodium acetate (0.33 g.; 4 mols.) and acetic anhydride (10 cc.) were stirred together mechanically in an oil bath at 140-150° C. for 5 minutes. The reaction mixture was cooled and absolute ether (30 cc.) added. The solid was filtered off, washed with ether, ground with water and dried. The dark red solid gave a red spirit solution.

*Example 77.*—The dye of Example 76 was also prepared from [5-(4-keto-2-thio-3-ethyltetrahydro-oxazole)][2-(3-ethylbenzthiazole)]-β-anilomethyldimethinmerocyanine, 3-ethylrhodanine, and sodium acetate in acetic anhydride. It was purified by dissolving in hot pyridine, cooling and precipitating with ether. The maroon solid had no definite M. P. but decomposition and melting took place from 215-270° C. Abs. max. of methyl alcoholic solution at 5475 Å. The dye decreased the blue sensitivity of a gelatino-silver-bromide emulsion and sensitized weakly from 5600 to 6000 Å.

*Example 78.*—[5-(4-keto-2-thio- 3 -ethyltetrahydro-oxazole)][2-(4-methyl-3-ethylthiazole)]-[β-methin - 5'-(3'-ethylrhodanine)]dimethinmerocyanine

[2-(4-methyl-3-ethylthiazole)][5-(3-ethylrhodanine)]α - anilomethyldimethinmerocyanine (1.04 g.), 4-keto-2-thio- 3 -ethyltetrahydro-oxazole (0.73 g.), anhydrous sodium acetate (0.82 g.) and acetic anhydride (25 cc.) were heated together at 145-150° C. for 7 minutes. The reaction mixture was poured into water. The aqueous liquid was decanted off and the residue induced to crystallize by stirring in spirit. It was recrystallized from methyl alcohol. The purple crystals had M. P. 215° C. (decomp.). A methyl alcoholic solution had abs. max. at 5545 Å. The dye sensitized a gelatino-silver-bromide emulsion weakly to 6000 Å. with the maximum at 5500, and strong depression of the normal blue sensitivity. To a gelatino-silver-chloride emulsion it was a strong sensitizer, the action extending to 6500 Å.

*Example 79.*—[5-(4-keto-2-thio-3-ethyltetrahydro - oxazole)][2 - (3-ethylbenzselenazole)][β-methin-5'-(3'-ethylrhodanine)]dimethinmerocyanine.

This was carried out as in Example 78, except that the first reactant there mentioned was replaced by [5-(3-ethylrhodanine)]-[2-(3-ethylbenzselenazole)]β - anilomethyldimethinmerocyanine, and the dye was similarly purified. Its dark purple crystals had M. P. 135° C. (decomp.). Abs. max. at 5190 Å. in methyl alcoholic solution. The dye decreased the blue sensitivity of a gelatino-silver-bromide emulsion, while introducing weak sensitivity up to 6100 Å.

*Example 80.*—[5-(3-ethylrhodanine)][2-(3-ethylbenzthiazole)][β-methin-5'-(3'- ethylrhodanine)]dimethinmerocyanine This dye which is also described in Example 37 can also be prepared as in Example 78, i. e. as follows: [5-(3-ethylrhodanine)][2-(3-ethylbenzthiazole)] - β - anilomethyldimethinmerocyanine (0.45 g.; 1 mol.), 3-ethylrhodanine (0.32 g.; 2 mols.), anhydrous sodium acetate (0.33 g.; 4 mols.) and acetic anhydride (10 cc.) were stirred together mechanically in an oil bath at 140-150° C. for 5 minutes. The reaction mixture was cooled and treated with absolute ether (30 cc.), the solid was filtered off, washed with ether, ground with water, and dried. It was beautifully crystalline and gave a bluish pink spirit solution.

*Example 81.*—[5-(3-ethylrhodanine)][2-(3-ethylbenzthiazole)][ββ'- dimethin - 2' -(1'-ethylquinolinium iodide)]dimethinmerocyanine

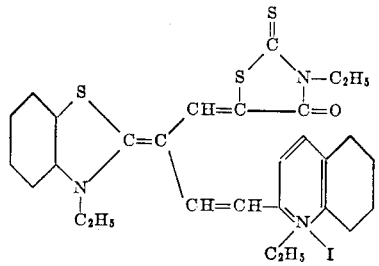

[5 - (3 - ethylrhodanine)][2 - (3 - ethylbenzthiazole)] - β - anilomethyldimethinmerocyanine (0.45 g.; 1 mol.), quinaldine ethiodide (0.30 g.; 1 mol.), anhydrous sodium acetate (0.33 g.; 4 mols.) and acetic anhydride (10 cc.) were stirred together mechanically in an oil bath at 140-150° C. for 5 minutes. The reaction mixture was cooled and absolute ether (30 cc.) added; the solid was filtered off, washed with ether, ground with water, and dried. The dark green crystals of dye gave a blue spirit solution.

*Example 82.*—[5-(3-ethylrhodanine)][2-(3-ethylbenzselenazole)][ββ'- dimethin-2'-(3'-ethylbenzthiazolium iodide)]dimethinmerocyanine

[5 - (3 - ethylrhodanine)][2 - (3 - ethylbenzselenazole)]β - anilomethyldimethinmerocyanine (0.50 g.), 2-methylbenzthiazole ethiodide (0.61 g.), anhydrous sodium acetate (0.33 g.), and acetic anhydride (15 cc.) were heated together at 145-150° C. for 3 minutes. Ether precipitation was carried out and the solid washed with water. The residual dye was recrystallized from methyl alcohol. Its dark purple crystals had M. P. 235° C. (decomp.). Abs. max. of methyl alcoholic solution at 5800 Å. The dye strongly depressed the blue sensitivity of a photographic emulsion and did not sensitize.

*Example 83.*—[5-(3-ethylrhodanine)][2-(3-ethylbenzselenazole)][ββ'- dimethin-2'-(3'-ethylbenzselenazolium iodide)]dimethinmerocyanine This was made as in Example 81 except that 2-methylbenzselenazole ethiodide took the place of 2-methylbenzthiazole ethiodide used there. After recrystallization from methyl alcohol the dark purple crystals had M. P. 245° C. (decomp.) Abs. max. at 5820 Å. for a methyl alcoholic solution. There was no sensitization but strong desensitization of a photographic silver halide emulsion.

*Example 84.*—[5-(3-ethylrhodanine)][2-(3-ethylbenzselenazole)][ββ'- dimethin-2'-(3'-ethyl-6':7' - benzbenzthiazolium iodide)]dimethinmerocyanine This was made as in Example 81, except that the 2-methylbenzthiazole ethiodide was replaced by 2-methyl-6:7-benzbenzthiazole ethiodide. The dye was boiled out with and recrystallized from methyl alcohol. The blue green crystals had M. P. 240° C. (decomp.). Abs. max. at 5930 Å. for a methyl alcoholic solution. The dye depressed the blue sensitivity of a gelatino-silver-bromide emulsion and did not confer extra-sensitivity.

*Example 85.*—[2 - (4 - methyl - 3 - ethylthiazole)]
[5-(3- ethylrhodanine)][αβ'- dimethin-2'-(3'-
ethyl - 6':7' - benzbenzthiazolium iodide)]di-
methinmerocyanine

[2-(4-methyl-3-ethylthiazole)][5-(3-ethylrho-
danine)] α - anilomethyldimethinmerocyanine
(0.83 g.), 2-methyl-6:7-benzbenzthiazole eth-
iodide (1.42 g.), anhydrous sodium acetate (0.66
g.), and acetic anhydride (30 cc.) were heated to-
gether at 145–150° C. for 3 minutes. The dye was
precipitated with ether and treated with hot wa-
er. The undissolved residue was recrystallized
from methyl alcohol. The brilliant green crystals
had M. P. 260° C. (decomp.). Abs. max. at 5945 Å.
in methyl alcoholic solution. The dye decreased
the blue sensitivity of a gelatino-silver-bromide
emulsion and did not confer extra-sensitivity.

*Example 86.*—[2-(4-methyl-3-ethylthiazole)][5-
(3 - ethylrhodanine)][αβ' - dimethin - 2' - (3'-
ethylbenzthiazolium iodide)]dimethinmerocya-
nine This was prepared as in Example 85, but the
part of 2-methyl-6:7-benzbenzthiazole ethiodide
was played by 2-methylbenzthiazole ethiodide.
After boiling out with methyl alcohol, the dye was
recrystallized from acetic acid. The emerald
green crystals had M. P. 240° C. (decomp.). Abs.
max. at 5750 Å. The dye did not sensitize a gelat-
ino-silver-bromide emulsion and depressed the
blue sensitivity.

*Example 87.*—[5-(1-phenyl-3-ethyl-2-thiohydan-
toin)][2-(4 - methyl-3-ethylthiazole)][ββ'-di-
methin-2' - (3' - ethylbenzthiazolium iodide)]
dimethinmerocyanine

[5-(1-phenyl-3-ethyl-2-thiohydantoin)][2-(4-
methyl - 3 - ethylthiazole)]β - anilomethyldi-
methinmerocyanine (1.19 g.), 2-methyl-benzthia-
zole ethiodide (1.53 g.), anhydrous sodium acetate
(0.82 g.), and acetic anhydride (30 cc.) were
heated together at 145–150° C. for 5 minutes.
The product was precipitated with ether, washed
with warm water, and boiled out with methyl
alcohol. Recrystallization of the residue from
methyl alcohol gave dark green crystals, M. P.
225° C. (decomp.). Abs. max. at 5765 Å. for a
methyl alcoholic solution. The dye decreased the
sensitivity of a photographic silver halide emul-
sion.

*Example 88.*— [2 - (4 - methyl-3-ethylthiazole)]
[5 - (3-ethylrhodanine)][αβ'-dimethin-2'-(3'-
ethyl - $\Delta^2$-thiazolium iodide)]dimethinmerocy-
anine

[2 - (3-ethyl-$\Delta^2$-thiazoline)][2 - (4 - methyl-3-
ethylthiazole)] γ - anilomethyltrimethincyanine
iodide (1.02 g.), 3-ethylrhodanine (0.48 g.), anhy-
drous sodium acetate (0.66 g.), and acetic anhy-
dride (15 cc.) were heated together at 140–150° C.
for 5 minutes. The dye was precipitated with
ether and ground with water, then recrystallized
from methyl alcohol. The purple crystals had
M. P. 214° C. (decomp.). Abs. max. at 5360 Å. for
a methyl alcoholic solution. It sensitized a gelat-
ino-silver-bromide emulsion up to 6200 Å., with
the maximum at 5900 Å., considerably decreas-
ing the blue sensitivity.

In connection with the above-described con-
densations involving compounds containing a re-
active methylene group adjacent to a carbonyl
group, non-cyclic as well as cyclic compounds
can be employed. Examples of compounds in
which the reactive methylene group is in an open
chain are malonic acid, malonic esters, malono-
nitrile, malonamide, alkyl 2-quinolylpyruvates,
acetylacetone, acetoacetamides, cyanoacetanilide,
benzoylacetonitrile, hippuric acid, aceturic acid
and p-nitrobenzylcyanide.

The polymethin dyes set forth by formulas
II, III, IV, V, VIII, IX and X can be incorporated
in photographic silver halide emulsions and some
of them act to spectrally (optically) sensitize the
emulsions. The effect of several of such dyes on
photographic silver halide emulsions is shown in
the foregoing examples. All of such dyes can be
employed as light-screening substances in the
preparation of photographic materials.

The aforesaid dyes are useful for extending
the spectral sensitivity of the customarily em-
ployed gelatino-silver-chloride, gelatino-silver-
chlorobromide, gelatino-silver-bromide, gelatino-
silver-chloroiodide, gelatino-silver-chlorobromio-
dide, and gelatino-silver-bromiodide developing-
out emulsions. To prepare emulsions sensitized
with one or more of our new dyes, it is only
necessary to disperse the dye or dyes in the emul-
sions. The methods of incorporating dyes in
emulsions are simple and are well known to those
skilled in the art. In practice it is convenient to
add the dyes to the emulsions in the form of a
solution in an appropriate solvent. Methanol has
proven satisfactory as a solvent for most of our
new dyes. With some of the dyes acetone or ethyl
alcohol can be used. The dyes are advantageous-
ly incorporated in the finished, washed emulsions
and should be uniformly distributed throughout
the emulsion.

The concentration of the dyes in the emulsions
can vary widely, e. g. from 5 to 100 mg. per liter
of flowable emulsion. The concentration of the
dyes will vary according to the type of emulsion
and according to the effects desired. The suitable
and most economical concentration for any given
emulsion will be apparent to those skilled in the
art, upon making the ordinary tests and observa-
tions customarily employed in the art of emulsion
making. To prepare a gelatino-silver-halide
emulsion sensitized with one or more of our dyes,
the following procedure is satisfactory: A quan-
tity of dye is dissolved in methyl alcohol or other
suitable solvent and a volume of this solution
(diluted with water, if desired) containing from
5 to 100 mg. of dye, is slowly added to about 1000
cc. of gelatino-silver-halide emulsion, with stir-
ring. Stirring is continued until the dye is
thoroughly dispersed in the emulsion. With most
of our dyes, from 10 to 20 mg. of dye per liter of
emulsion suffices to produce the maximum sen-
sitizing effect. With the finer grain emulsions
somewhat larger amounts of dye may be needed
to produce the maximum effect.

The above statements are only illustrative, as
it is apparent that the dyes can be incorporated
in photographic emulsions by any of the other
methods customarily employed in the art, e. g. by
bathing a plate or film upon which an emulsion
is coated in a solution of the dye in an appro-
priate solvent. However, bathing methods are
ordinarily not to be preferred. Emulsions sen-
sitized with the dyes can be coated on suitable
supports, such as glass, cellulose derivative film,
resin film or paper in the usual manner.

What we claim as our invention and desire to
be secured by Letters Patent of the United States
is:

1. The dianiloisopropylidene compounds which are represented by the following general formula:

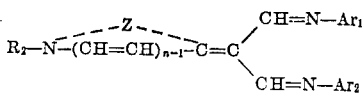

wherein $R_2$ represents an alkyyl group, $n$ represents a positive integer of from 1 to 2, Z represents the non-metallic atoms necessary to complete a heterocyclic nucleus containing from 5 to 6 atoms in the heterocyclic ring, and $Ar_1$ and $Ar_2$ each represents an aryl group.

2. The dianiloisopropylidene compounds which are represented by the following general formula:

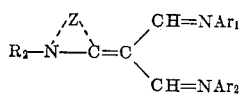

wherein $R_2$ represents a primary alkyl group of the formula $C_mH_{2m+1}$ wherein $m$ represents a positive integer of from 1 to 4, Z represents the non-metallic atoms necessary to complete a heterocyclic nucleus of the benzthiazole series, and $Ar_1$ and $Ar_2$ each represents an aryl group of the benzene series.

3. The dianiloisopropylidene compound which is represented by the following formula:

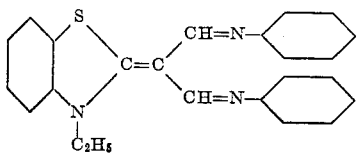

4. The dianiloisopropylidene compound which is represented by the following general formula:

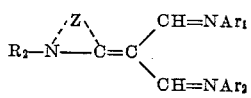

wherein $R_2$ represents a primary alkyl group of the formula $C_mH_{2m+1}$ wherein $m$ represents a positive integer of from 1 to 4, Z represents the non-metallic atoms necessary to complete a heterocyclic nucleus of the benzselenazole series, and $Ar_1$ and $Ar_2$ each represents an aryl group of the benzene series.

5. The dianiloisopropylidene compound which is represented by the following formula:

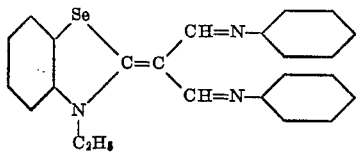

6. The dianiloisopropylidene compounds which are represented by the following general formula:

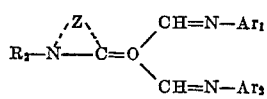

wherein $R_2$ represents an alkyl group' of the formula $C_mH_{2m+1}$ wherein $m$ represents a positive integer of from 1 to 4, Z represents the non-metallic atoms necessary to complete a heterocyclic nucleus of the thiazole series and $Ar_1$ and $Ar_2$ each represents an aryl group of the benzene series.

7. The dianiloisopropylidene compound which is represented by the following formula:

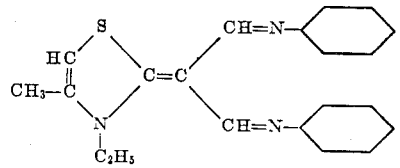

8. A process for preparing a dianiloisopropylidene compound comprising condensing, in the presence of a water-binding agent, an alkylisoformanilide selected from those represented by the following general formula:

$$R_1O-CH=N-Ar_1$$

wherein $R_1$ represents an alkyl group and $Ar_1$ represents an aryl group of the benzene series with a heterocyclic nitrogen base selected from the heterocyclic nitrogen bases represented by the following general formula:

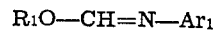

wherein $R_2$ represents an alkyl group, $n$ represents a positive integer of from 1 to 2, and Z represents the non-metallic atoms necessary to complete a heterocyclic nucleus containing from 5 to 6 atoms in the heterocyclic ring.

9. A process for preparing a dianiloisopropylidene compound comprising condensing, in the presence of zinc chloride, an alkylisoformanilide selected from those represented by the following general formula:

$$R_1O-CH=N-Ar_1$$

wherein $R_1$ represents an alkyl group and $Ar_1$ represents an aryl group of the benzene series with a heterocyclic nitrogen base selected from the heterocyclic nitrogen bases represented by the following general formula:

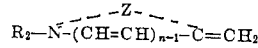

wherein $R_2$ represents an alkyl group, $n$ represents a positive integer of from 1 to 2, and Z represents the non-metallic atoms necessary to complete a heterocyclic nucleus containing from 5 to 6 atoms in the heterocyclic ring.

10. A process for preparing a dianiloisopropylidene compound comprising condensing, in the presence of zinc chloride, an alkylisoformanilide selected from those represented by the following general formula:

$$R_1O-CH=N-Ar_1$$

wherein $R_1$ represents a primary alkyl group of the formula $C_mH_{2m+1}$ wherein $m$ represents a positive integer of from 1 to 4, and $Ar_1$ represents an aryl group of the benzene series, with a heterocyclic nitrogen base selected from those which are represented by the following general formula:

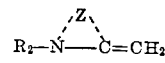

wherein $R_2$ represents a primary alkyl group of the formula $C_mH_{2m+1}$ wherein $m$ represents a positive integer of from 1 to 4, and Z represents the non-metallic atoms necessary to complete a heterocyclic nucleus of the benzthiazole series.

11. A process for preparing a dianiloisopropylidene compound comprising condensing, in the presence of zinc chloride, an alkylisoformanilide selected from those represented by the following general formula:

$$R_1O-CH=N-Ar_1$$

wherein $R_1$ represents a primary alkyl group of the formula $C_mH_{2m+1}$ wherein $m$ represents a positive integer of from 1 to 4, and $Ar_1$ represents an aryl group of the benzene series, with a heteracyclic nitrogen base selected from those which are represented by the following general formula:

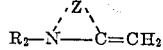

wherein $R_2$ represents a primary alkyl group of the formula $C_mH_{2m+1}$ wherein $m$ represents a positive integer of from 1 to 4, and Z represents the non-metallic atoms necessary to complete a heterocyclic nucleus of the benzoselenazole series.

12. A process for preparing a daniloisopropylidene compound comprising condensing, in the presence of zinc chloride, an alkylisoformanilide selected from those represented by the following general formula:

$$R_1O-CH=N-Ar_1$$

wherein $R_1$ represents a primary alkyl group of the formula $C_mH_{2m+1}$ wherein $m$ represents a positive integer of from 1 to 4, and $Ar_1$ represents an aryl group of the benzene series, with a heterocyclic nitrogen base selected from those which are represented by the following general formula:

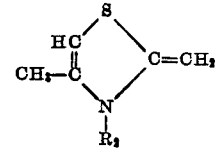

wherein $R_2$ represents a primary alkyl group of the formula $C_mH_{2m+1}$ wherein $m$ represents a positive integer of from 1 to 4.

FRANCES M. HAMER.
RUSSELL J. RATHBONE.
BARBARA SEATON WINTON.

No references cited.

Certificate of Correction

Patent No. 2,484,503 October 11, 1949

FRANCES M. HAMER ET AL.

It is hereby certified that errors appear in the printed specification of the above numbered patent requiring correction as follows:

Column 2, line 28, after "benzbenzthiazoline," and before "etc." insert *3-ethyl-2-methylene-6:7-benzbenzthiazoline,*; column 9, line 47, in the formula, for "Z" read $Z_1$; column 19, line 18, for "dianiloisopropylidenebenzthiazoline" read *dianiloisopropylidenebenzselenazoline*; column 33, line 8, for "alkyyl" read *alkyl*; column 34, line 45, strike out "$R_1O-CH=N-Ar_1$"; column 35, lines 8 and 9, for "heteracyclic" read *heterocyclic*;

and that the said Letters Patent should be read with these corrections therein that the same may conform to the record of the case in the Patent Office.

Signed and sealed this 7th day of March, A. D. 1950.

[SEAL]

THOMAS F. MURPHY,
*Assistant Commissioner of Patents.*